US009747008B2

(12) United States Patent
Allgair

(10) Patent No.: US 9,747,008 B2
(45) Date of Patent: Aug. 29, 2017

(54) METHOD AND USER INTERFACE DEVICE FOR EFFICIENT COLLABORATION IN A MAINTENANCE ENVIRONMENT

(71) Applicant: Gregory Paul Allgair, Ellicott City, MD (US)

(72) Inventor: Gregory Paul Allgair, Ellicott City, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 159 days.

(21) Appl. No.: 13/975,124

(22) Filed: Aug. 23, 2013

(65) Prior Publication Data

US 2014/0059468 A1 Feb. 27, 2014

(51) Int. Cl.
| | |
|---|---|
| *G06Q 10/06* | (2012.01) |
| *G06Q 10/00* | (2012.01) |
| *G06Q 10/08* | (2012.01) |
| *G06F 3/0484* | (2013.01) |
| *G06Q 10/10* | (2012.01) |

(52) U.S. Cl.
CPC ..... *G06F 3/04842* (2013.01); *G06Q 10/0633* (2013.01); *G06Q 10/06311* (2013.01); *G06Q 10/101* (2013.01); *G06Q 10/103* (2013.01)

(58) Field of Classification Search
CPC ............................ G06F 8/34; G06Q 10/06311
USPC ......................................................... 715/771
See application file for complete search history.

(56) References Cited

U.S. PATENT DOCUMENTS

| | | | |
|---|---|---|---|
| 8,379,053 B1* | 2/2013 | Phillips et al. | ............... 345/619 |
| 2004/0024662 A1* | 2/2004 | Gray et al. | ....................... 705/29 |
| 2005/0090951 A1* | 4/2005 | Good | ........................ G08G 1/20 |
| | | | 701/31.4 |

(Continued)

OTHER PUBLICATIONS (Jul. 5, 2011). Retrieved May 8, 2015, from http://web.archive.org/web/20110705085401/http://forums.bicycletutor.com/.*

(Continued)

*Primary Examiner* — Abdullah Al Kawsar
*Assistant Examiner* — David Luu
(74) *Attorney, Agent, or Firm* — Andrews Kurth Kenyon LLP; Sean S. Wooden

(57) ABSTRACT

Embodiments include methods for creating collaborative information threads relating to maintenance or repair, comprising receiving a user selection of an equipment unit; displaying information related to one or more collaborative threads, where each thread corresponds to a task related to the selected unit; receiving user selection of one of the collaborative threads; and displaying at least a portion of the selected collaborative thread, including one or more previous actions and one or more continuation options. Embodiments also include methods for interactive selection and display of maintenance or repair information, comprising displaying a visual representation of an equipment; receiving user selection of a region for which information is desired; displaying a list of elements within the region; receiving a user selection of one of the elements; and displaying information related to the selected element. Embodiments also include user interface devices and computer-readable media embodying one or more of these methods.

27 Claims, 25 Drawing Sheets

(56) References Cited

U.S. PATENT DOCUMENTS

| | | | |
|---|---|---|---|
| 2007/0226032 A1* | 9/2007 | White | G06Q 10/101 705/300 |
| 2008/0147810 A1* | 6/2008 | Kumar et al. | 709/206 |
| 2009/0138116 A1* | 5/2009 | Austin et al. | 700/108 |
| 2009/0172558 A1* | 7/2009 | Pickens et al. | 715/741 |
| 2009/0248401 A1* | 10/2009 | Grabarnik et al. | 704/10 |
| 2010/0299171 A1* | 11/2010 | Lau et al. | 705/8 |
| 2013/0097490 A1* | 4/2013 | Kotler et al. | 715/255 |
| 2013/0226907 A1* | 8/2013 | Wolf | G06F 17/30554 707/722 |
| 2013/0288719 A1* | 10/2013 | Alonzo | 455/457 |
| 2014/0068445 A1* | 3/2014 | Kempf | G06Q 10/06312 715/736 |
| 2014/0195963 A1* | 7/2014 | Cheung et al. | 715/781 |

OTHER PUBLICATIONS (Apr. 26, 2012). Retrieved May 8, 2015, from http://web.archive.org/web/20120426024826/http://www.datasheetarchive.com/lm1173.3-datasheet.html.*

* cited by examiner

| | | | |
|---|---|---|---|
| 200 | | | |
| | Fleet | 45 | 1 | 13 |
| 210 | ✈ 59 | | | |
| | Alpha AFB | 26 | 0 | 6 |
| 220 | ✈ 32 | | | |
| | Beta AFB | 19 | 1 | 7 |
| 230 | ✈ 27 | | | |
| 235 | | ENGINE | BOOM | CENTER LINE HOSE REEL |
| 240 | Spares | 5   16 | 2   1 | 5   12 |

| | DEPOT | FMC | NMCMU | NMCS | PMCM |
|---|---|---|---|---|---|
| Fleet Status | 6 | 45 | 5 | 2 | 1 |

| Current Location | Home Location | Tail # | Status | Remarks | EDIC/ETIC |
|---|---|---|---|---|---|
| Honolulu | Beta AFB | 01-2345 | FMC | | |
| AOR | Beta AFB | 12-3456 | FMC | | |
| Greensboro | Alpha AFB | 12-3457 | DEPOT | 09 Sep 12 (CDPL Approved) | |
| Beta AFB | Beta AFB | 12-3458 | PMCM | #1 ENG PNUE PRESS SPIKES | |
| Beta AFB | Beta AFB | 23-4567 | FMC | | |
| Beta AFB | Beta AFB | 23-4568 | FMC | | |

METHOD AND USER INTERFACE DEVICE FOR EFFICIENT COLLABORATION IN A MAINTENANCE ENVIRONMENT

CROSS-REFERENCE TO RELATED APPLICATIONS

This application claims the priority of U.S. Provisional Application Ser. No. 61/593,043, entitled "Method and User Interface Device for Efficient Collaboration in a Maintenance Environment," which was filed Aug. 24, 2012 and is incorporated herein by reference.

FIELD OF TECHNOLOGY

The disclosure herein relates to the field of application-specific user interface methods and devices, and more particularly to methods and user interface devices for improving operations efficiency in a maintenance environment by providing the ability to quickly identify and access necessary information and to collaborate with others during execution of a maintenance task.

BACKGROUND

In many large, sophisticated systems that are kept in operation over periods of many years, maintenance is a significant portion of the total lifetime cost of the system. This portion is even higher for systems that are utilized for many years in very demanding, mission-critical applications and environments, such as weapons systems, aircraft, and military vehicles (e.g., tanks). According to one estimate provided by the United States Department of Defense, the operations and maintenance comprises up to 70% of the total cost of some weapons systems. In this current era of government budget deficits, there is significant pressure to reduce the costs of such sophisticated systems. Given its large portion of the total costs, maintenance may be a fertile area for realizing cost savings through various improvements in efficiency.

Maintenance of military systems, including aircraft, vehicles, etc., is very complex—and therefore costly—due to a variety of reasons. First, the systems themselves are usually very complex, consisting of numerous assemblies, subassemblies, modules, parts, etc. manufactured and/or assembled by a host of different suppliers. Each of these items may have its own documentation such as data sheets, reference manuals, repair guides, etc. Second, due to the high cost and mission-critical nature of many military systems, it is extremely undesirable for them to be taken out of deployment for any significant period of time. Accordingly, maintenance and repair of such systems must be performed very quickly and efficiently—albeit very precisely and without error. Third, maintenance tasks on such systems are often very unstructured. For example, the maintenance technician who is assigned to repair a military aircraft may be presented with one (or more) of hundreds or even thousands of possible problems, most of which he invariably has not encountered before. Fourth, maintenance and repair of military systems is geographically disperse. For example, the fleet of a particular type of aircraft may be kept at various air bases around the world as well as, in some cases, at a central maintenance depot. Each location must be fully capable of maintenance and repair. Finally, given the importance of such systems to national security, maintenance and repair operations must take place in a secure environment. Due to these complexities, it is difficult to efficiently and quickly perform maintenance and make repairs to complex systems, such as military aircraft, while managing priorities and meeting any performance metrics that may exist.

SUMMARY

Embodiments of the present disclosure include a user interface device (e.g., a tablet computer) comprising a touch-sensitive display and a processor configured with application program code that provides an efficient collaboration for maintenance or repair of complex systems and equipment, such as military aircraft. When executed by the processor, the application program causes the device to receive a user selection via the touch-sensitive display. The user selection may cause the device to display a variety of information, including status information for a fleet of vehicles (e.g., aircraft) or equipment (e.g., weapon system); status information for an individual fleet unit; an interactive, three-dimensional model of the type of unit subject to maintenance or repair; technical documentation for a particular fleet unit subject to maintenance or repair; one or more threads of collaborative interactions among users that can be organized and searched in various ways; and statistical information related to the fleet of vehicles. Moreover, the application program receives user input comprising one or more of text, audio, images, video and chat, and associates such user input with a selected thread of collaborative interaction.

Embodiments also comprise methods for displaying, searching, selecting, and adding to threads of collaborative interaction. Embodiments also comprise computer-readable media comprising any of these methods and/or the application program code described above with respect to the user interface device embodiment.

DESCRIPTION OF THE DRAWINGS

The detailed description will refer to the following drawings, wherein like numerals refer to like elements, and wherein:

FIG. 2 is an exemplary fleet status screen display, according to embodiments of the present disclosure;

FIG. 3B is another exemplary fleet status screen display, according to embodiments of the present disclosure;

FIG. 12 is an exemplary collaboration screen display showing a directory of a particular category of documents than can be viewed as part of a collaboration thread pertaining to a particular fleet unit, according to one or more embodiments of the present disclosure;

DETAILED DESCRIPTION

Figure 1:
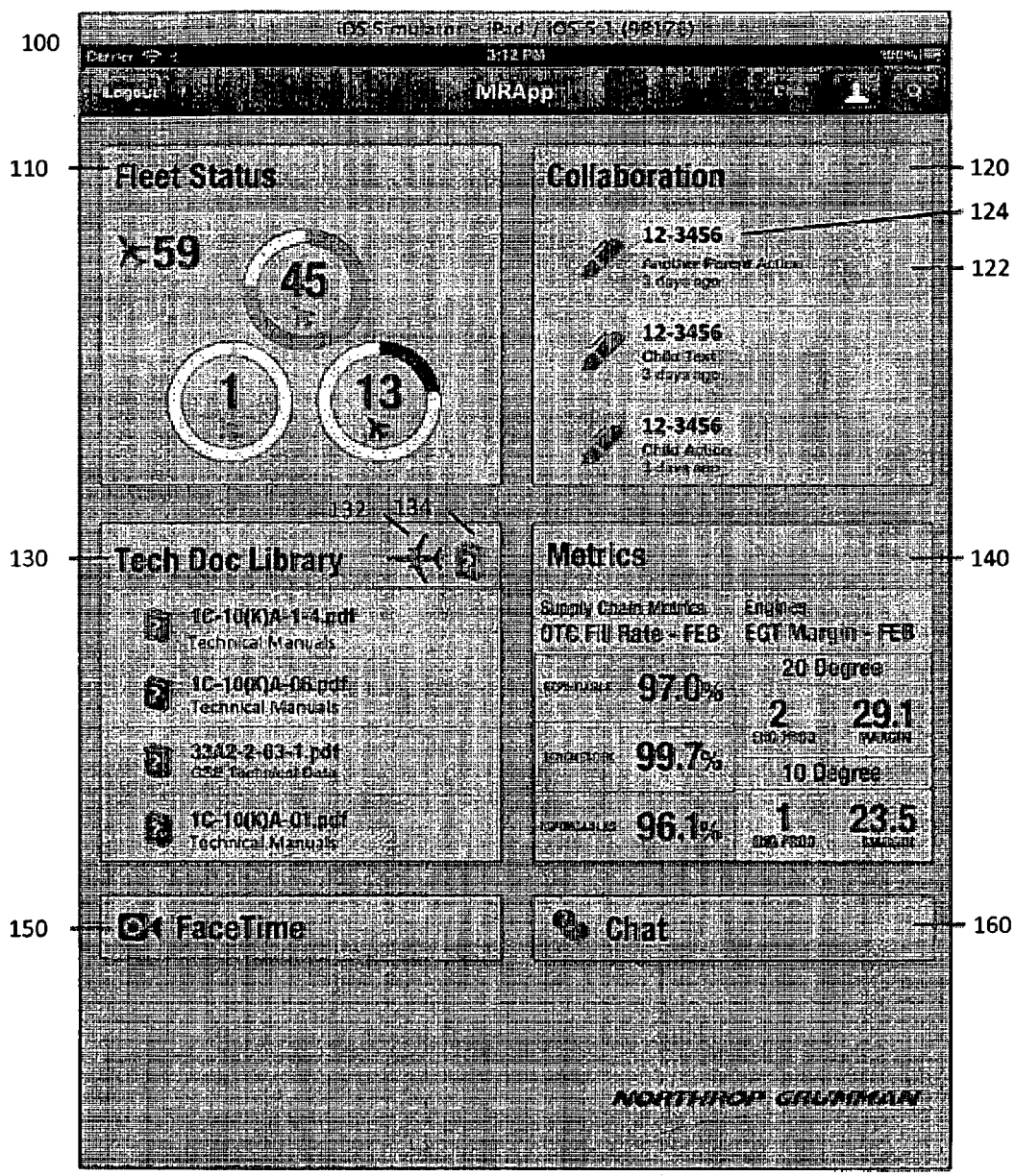
FIG. 1 is a home screen display rendered by an application program executing on a user interface device, according to embodiments of the present disclosure.

In general, maintenance and/or repair (MR) tasks can be broken into two phases—discovery, which runs from the time a problem is noted until the time it is diagnosed; and execution, which runs from problem diagnosis to task completion. Although it is desirable that both phases be as short and efficient as possible, the duration of the discovery phase is generally more variable than the execution phase because of the initial unknowns and the collection of information. For example, a MR worker assigned to repair or maintain a complex system (e.g., aircraft, land vehicle, weapon system, etc.) in most cases does not know the source or even all the symptoms of the particular problem. The MR worker usually has limited initial information and begins by visually inspecting the system to be repaired. In many cases, the MR worker may not have the necessary experience or expertise with the particular problem—or even the system itself—to make a diagnosis, and needs to identify and consult with others having the necessary experience or expertise. Such persons may be unknown to the MR worker or located at a different facility, making them difficult to identify and/or consult.

Alternately, or in addition, the MR worker may need to find, identify, and access technical or other information that is relevant to diagnosing the problem. For example, the MR worker may need to access a checklist document that identifies the particular sequence or steps required for the system. Due to the large number and size of technical documents pertaining to the various parts of the system under maintenance or repair, it is practically impossible for even the most experienced MR worker to anticipate which documents are needed at the initial inspection. Furthermore, the MR worker may be limited in their ability to search MR records for information about similar problems or repairs to the same equipment or to others of the same type among a fleet. Furthermore, an MR worker is typically limited in the sources of information that they can use to diagnose the problem during the discovery phase. For example, the MR worker assigned to repair a particular piece of equipment may not have access to first-hand description of the symptoms of the problem from personnel who were operating the equipment when the problem occurred, such as aircraft crew members. As such, the discovery phase typically is an iterative process of inspection, identifying and reviewing documentation and records, consultation, more inspection, etc. which reduces the overall efficiency of the MR operation.

To enable more efficient performance of MR tasks on complex systems, what is needed is a way to provide MR workers with relevant, timely, and context-sensitive information in a format that is convenient and user-friendly. More specifically, what is needed is a tool that provides MR workers with easy access to all relevant technical documentation, MR records, and flexible collaboration with necessary personnel, thereby turning the discovery phase into an efficient, non-iterative process. Currently available tools fall short because they address only a facet or subset of the overall MR efficiency problem or provide a solution that does not meet the needs of improved efficiency and mobility. For example, certain tools may allow a user to collaborate with another user, other tools may allow a user to view a particular document, and other tools may allow the user to search or add information to a database. Such one-dimensional tools do not work together, require users to manually associate the information exchanged within each of the tools, and do not provide all the features needed in the MR environment for complex systems.

Embodiments of the present disclosure provide these and other benefits through a user interface device (e.g., a tablet computer) comprising a touch-sensitive display and a processor configured with application program code that, when executed by the processor, causes the device to receive a user selection via the touch-sensitive display, which further causes the device to perform one or more of the following functions: graphically display status information for a fleet of vehicles (e.g., aircraft) or equipment (e.g., weapon system); display technical documentation for a particular vehicle or equipment under maintenance or repair selected by a user via a graphical representation of the vehicle or equipment; display one or more threads of collaborative interactions among users that can be organized and searched in various ways; receive user input comprising one or more of text, audio, images, video, and chat; associate such user input with a selected thread; and display statistical information related to the fleet of vehicles. Embodiments also comprise a computer-readable medium comprising the application program code described above with respect to the user interface device embodiment.

FIG. 1 is an exemplary home screen display of an application program for execution on a user interface device, according to embodiments of the present disclosure. Display 100 comprises several main display elements including Fleet Status 110, Collaboration 120, Tech Doc Library 130, Metrics 140, Facetime 150, and Chat 160. Each of these main display elements corresponds to a particular type of functionality or information and each display element occupies a clearly defined area of display 100. In some embodiments, when a user of the user interface device touches the screen within a particular defined area (e.g., within the boundaries of Fleet Status 110), the application program receives an indicator that the user has selected the element corresponding to that defined area and executes a corresponding action, such as displaying another screen corresponding to the selected element.

The main display elements also may provide summary or high-level information related to the corresponding functionality. For example, as shown in FIG. 1, Fleet Status 110 may provide a summary of the status of all units (e.g., aircraft) in a fleet of equipment, such as how many are fully operational, partially operational, or non-operational. By further example, Metrics 140 may provide a summary of key operational statistics of the fleet of equipment, such as efficiency of the supply chain for spare parts needed in MR operations for the fleet. Other main display elements enable the user to initiate a communication with other individuals (e.g., aircraft crew members or field service representatives) when selected. For example, selecting chat 160 allows the user to establish a text-based chat or instant messaging session and selecting Facetime 150 allows the user to establish a video-based communication, e.g., by using the Facetime® application provided by Apple, Inc.

When a user touches display element Fleet Status 110, the application program renders the Fleet Status screen display 200 shown in FIG. 2. Display 200 comprises display element 210 showing the overall fleet status summary information shown in Fleet Status 110 of FIG. 1, as well as display elements 220 and 230 showing a status summary for subdivided portions of the fleet of equipment. Display elements 220 and 230 show status summary for the fleet subdivided by home location, but the person of ordinary skill will recognize that any subdivision or categorization can be used. Display 200 also may comprise an alternative fleet status such as shown in display element 250, in which the operational status is broken down into more granular categories. Display 200 may also comprise a spare parts status display element 240, which displays the quantity of certain spare parts (e.g., engines, fueling boom, etc.) within the inventory for the MR operations of the fleet. Finally, display 200 also may comprise a summary table 260, which provides a set of information for each unit in the fleet. Summary table 260 can be organized or ordered in a variety of different ways, including alphabetically or numerically according to any of the columns shown. For example, a user could indicate that the application should order the summary table 260 numerically by unit identifier (e.g., tail number for an aircraft) by touching the screen at the location of the "Tail #" column heading. The user also may scroll up and down through summary table 260, e.g., by swiping a finger vertically on the area of the screen displaying the listings of summary table 260.

Figure 3A:
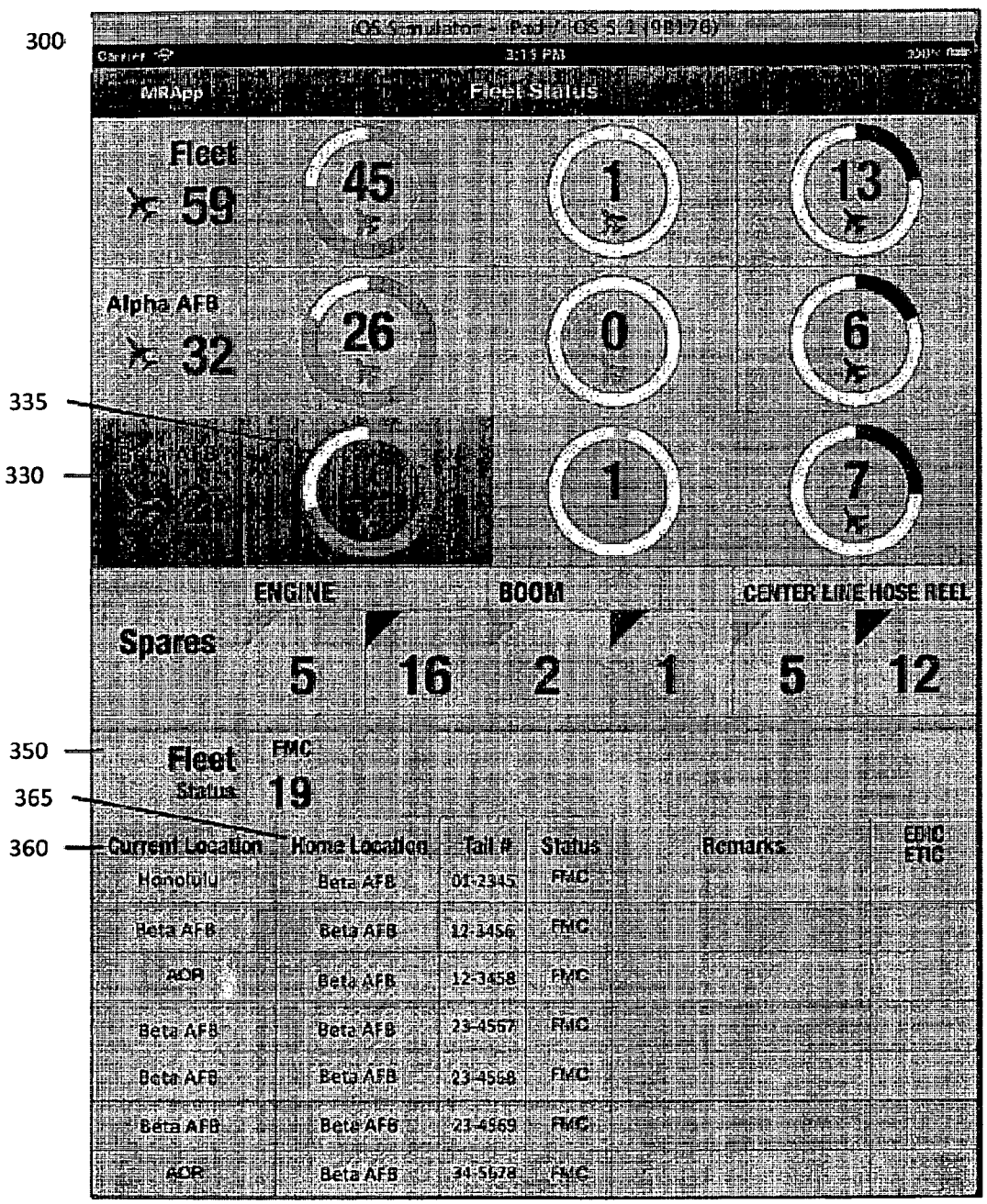
FIG. 3A is another exemplary fleet status screen display, according to embodiments of the present disclosure.
Figure 3B:
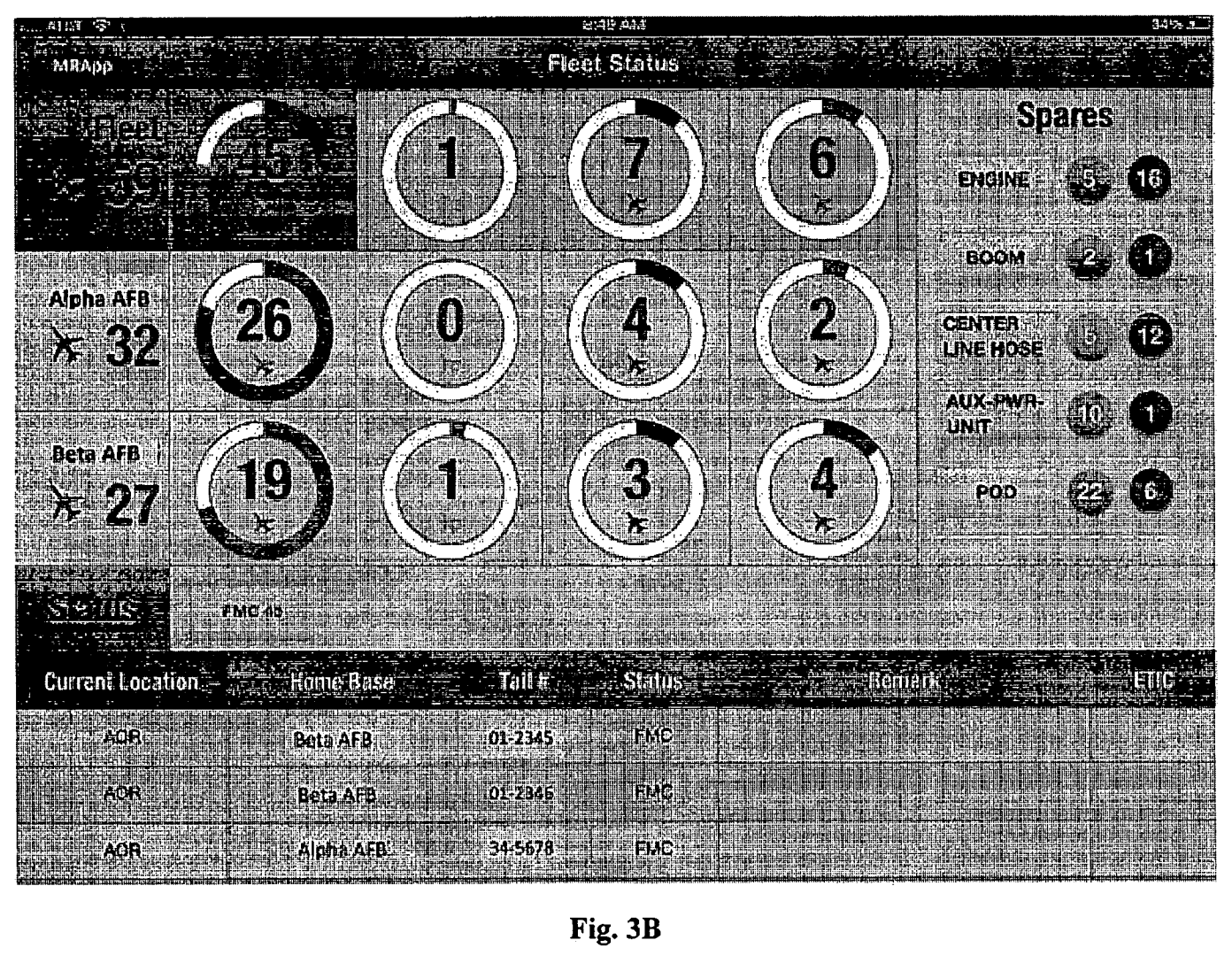

Moreover, the user can instruct the application program to change the display of fleet status shown in FIG. 2 in many other ways. For example, if the user selects sub-element 235 (showing 19 operational aircraft for Beta AFB) of display element 230, the application program will change the screen display to show display 300 of FIG. 3. In display 300, sub-element 335 of display element 330 is highlighted to indicate the user's selection. In addition, alternate fleet status 350 now shows a summary of the status of only the fleet units associated with the selected sub-element 335, e.g., the 19 operational aircraft for Beta AFB. Additionally, the user's selection of sub-element 335 is reflected in the revised summary table 360 which shows only the listings associated with selected s 335. Alternatively, revised summary table may show all listings but order them according to column corresponding to the user selection, e.g., home location of Beta AFB corresponding to selected sub-element 335.

Referring back to FIG. 1, the application program represented by screen display 100 also enables collaborative interactions among users that can be organized and searched in various ways, such as by task, equipment identifier, etc. Referring back to FIG. 1, display element collaboration 120 displays information related to the most recent collaborative interactions, including interaction 122. Each of the collaborative interactions displayed in the collaboration 120 display element is identified by the unit with which it is associated, e.g., unit identifier 124 of interaction 122. Furthermore, when a user selects collaboration 120, the application program receives an indication of the user selection and renders a main collaboration screen display 400. Display 400 comprises a list of collaboration display elements, including collaborations 410 and 440, which may be arranged in any order such as by equipment or unit identifier (e.g., aircraft tail number, vehicle bumper number), chronologically, reverse chronologically, etc. The user also may scroll up and down through collaborations, e.g., by swiping a finger vertically on the area of the screen displaying the listing of collaborations. Each of the collaboration display elements, such as collaborations 410 and 440, may represent one or more collaborative threads associated with a particular fleet unit (e.g., unit 34-5679 for collaboration 410), with each collaborative thread pertaining to a different MR issue related to that particular fleet unit.

Each collaboration display elements comprises several sub-elements, such as equipment identifier 414 and equipment status indicator 418 associated with collaboration 410. In some embodiments, the equipment status indicator is displayed as an icon representative of the type of equipment (e.g., aircraft) and is colored according to the status of the individual fleet unit, using the same color scheme used in the Fleet Status 110 element shown in FIG. 1. Display 400 also may comprise one or more user action buttons, such as action buttons 420, 425, 430 and 435 shown in the upper right-hand corner of display 400. When a user selects an action button, the application program receives an indication of the user selection and initiates the corresponding action. For example, if a user touches action button 420, the application program may display a search window, in which the user can enter a search term and initiate a search of the collaborations, after which the application program will display only the collaborations in which the search term appears.

Figure 5A:
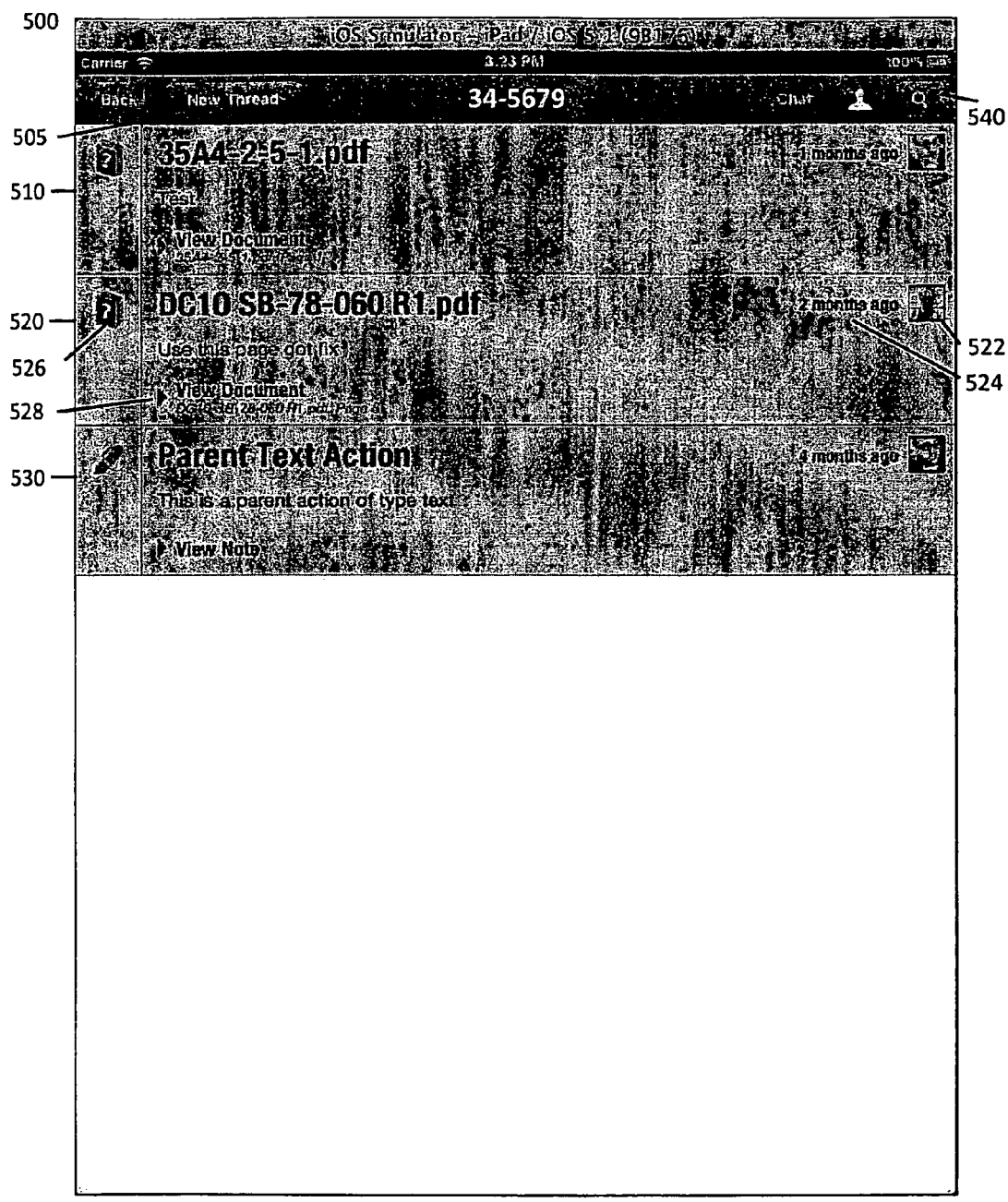
FIG. 5A is an exemplary collaboration screen display for a particular fleet unit, according to embodiments of the present disclosure.

If the user touches an area of display 400 corresponding to a selected collaboration, the application program receives an indication of the user selection and changes the screen display to display all collaborative threads corresponding to the selected collaboration. For example, if the user touches the area corresponding to collaboration 410, which relates to fleet unit 34-5679, the application program will change the screen display to show a display 500 of collaborative threads associated with the selected collaboration. In this example, display 500 will display the threads related to fleet unit 34-5679. One embodiment of display 500 is shown in FIG. 5A. In the embodiment of FIG. 5A, display 500 comprises thread elements 510, 520, and 530 that display a variety of information sub-elements associated with the particular thread. In this embodiment, thread elements 510, 520, and 530 display information identifying the most recent action associated with each of these respective threads. For example, thread element 520 comprises a user identifier icon 522 showing an identifier of the user responsible for the last action on thread 520, a time identifier 524 showing the time since the last action, an action type icon 526 representing the type of the last action, and an action summary 528 showing a summary of the details of the last action. In the example of thread 520, action icon 526 shows that the last action was an access to a technical document, and action summary 528 lists the particular document and page that was accessed.

Figure 4:
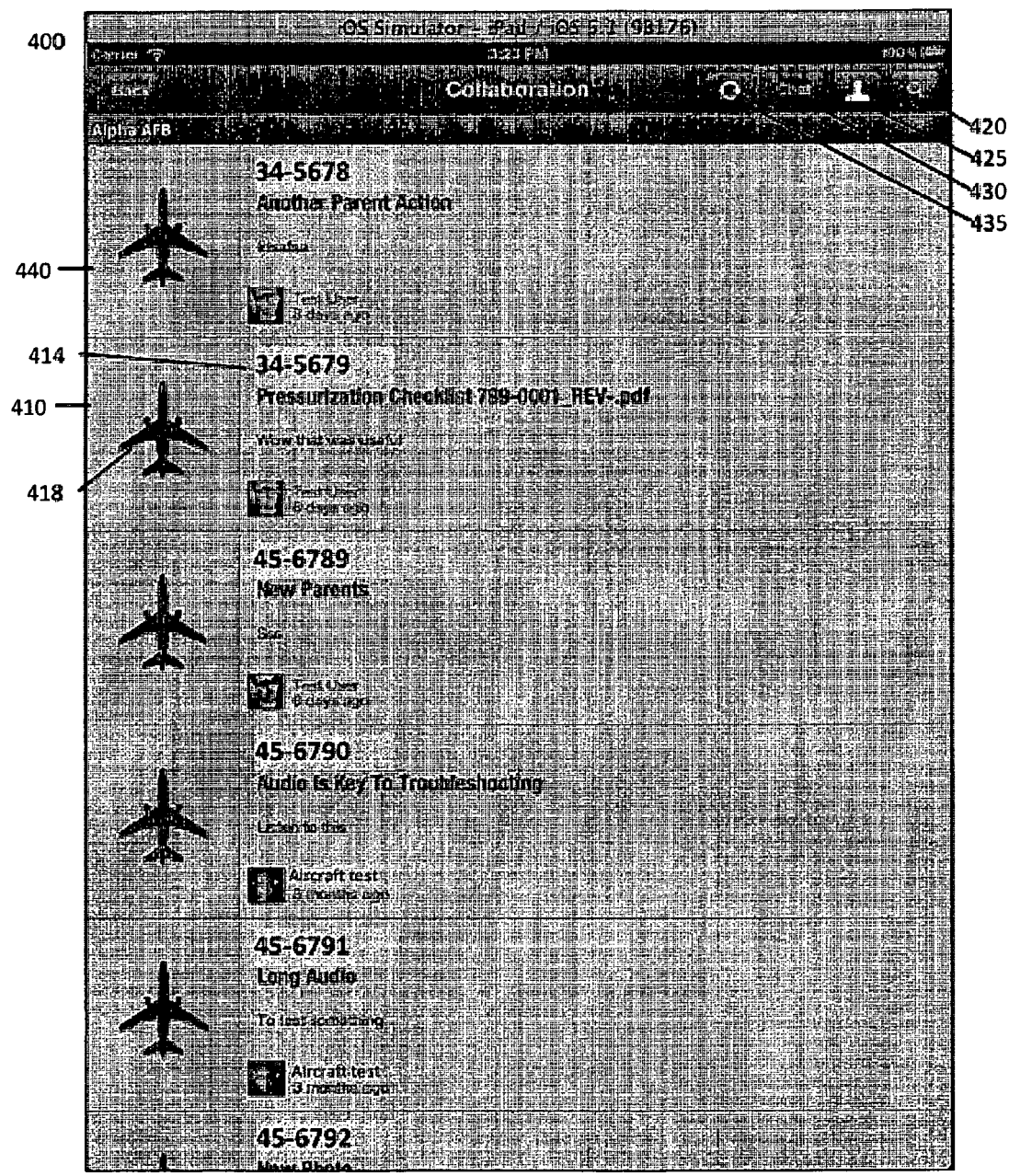
FIG. 4 is an exemplary collaboration screen display, according to embodiments of the present disclosure.

Display 500 also may comprise one or more user action buttons, including search button 540, shown in the upper right-hand corner of display 500. Search button 540 has similar functionality as search action button 420 described above with reference to FIG. 4. Also, display 500 may comprise a new thread action button 505. If the user touches the area of display 500 corresponding to thread action button 505, the application program will create a new collaboration thread associated with the particular fleet unit shown in display 500, e.g., fleet unit 34-5679 shown in FIG. 5A. The application program may prompt to user to enter information identifying the new thread. Once it receives this information from the user, the application program will display the new thread on display 500, ordered among the other threads according to the user's selected preference.

Figure 5B:
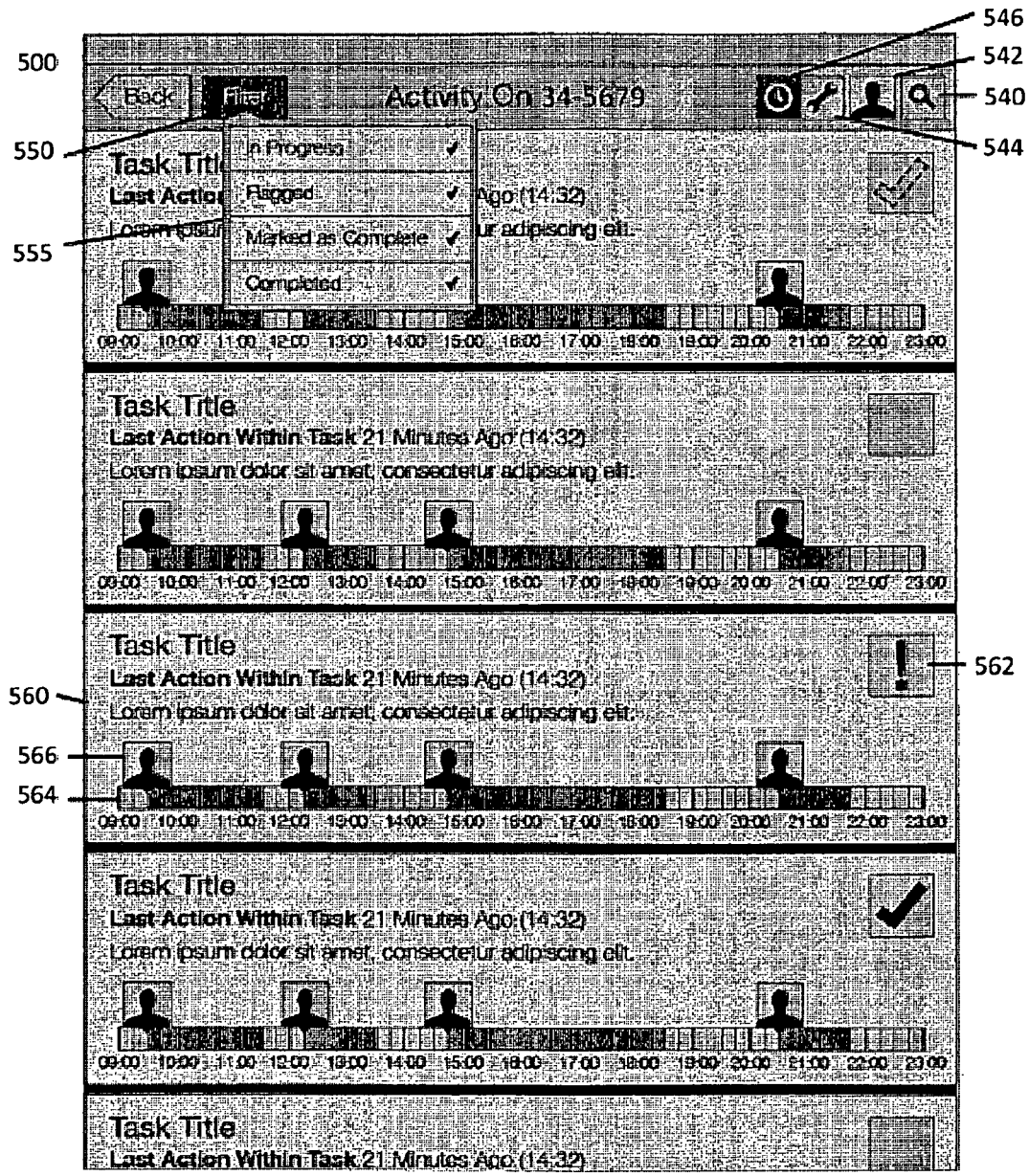
FIG. 5B is another exemplary collaboration screen display for a particular fleet unit, according to embodiments of the present disclosure.

FIG. 5B shows another embodiment of display 500. In this embodiment, display 500 comprises one or more thread elements, such as thread element 560, that display a variety of information sub-elements associated with the particular thread. For example, thread element 560 comprises thread status indicator 562, which indicates the status of the MR task associated with this thread. Indicator 562 may take on any of the values shown in drop-down list 555, which may be represented graphically by an icon. Thread element 560 may also include a timeline 564, which shows the periods of activity on the MR task associated with thread element 560. Timeline 564 may comprise one or more entries, such as entry 564, each of which include an icon identifying an individual who worked on the MR task and the time during which the individual worked on the task.

Display 500 of FIG. 5B also may comprise a filter button 550, which when selected by the user will cause the application program to display the drop-down list 555. This list may comprise the different values of thread status, such as shown in thread status indicator 562. Each of the values in drop-down list 555 may be individually selectable by the user to be "on" or "off." If a particular value is selected to be "on" (as indicated, for example, by a check mark next to the value in list 555), the list of threads shown in display 500 will include all threads with that status value; otherwise, those threads will not be displayed. A value in drop-down list 555 selected by the user to by "off" may be indicated by, for example, the absence of the mark that indicates the value to be "on", or by a different mark that is recognizable by the user.

As shown in FIG. 5B, display 500 also may comprise one or more user action buttons, including search button 540. For example, these action buttons may be located in the upper right-hand corner of display 500, such as shown in FIG. 5B, although the person of ordinary skill will recognize that other locations for the action buttons are possible. Selecting action button 546 will cause the application program to display the screen display 500 shown in FIG. 5B, which may be referred to as a personnel-centric timeline display. The selection of a personnel-centric timeline is indicated by the darkened condition of action button 544.

Figure 5C:
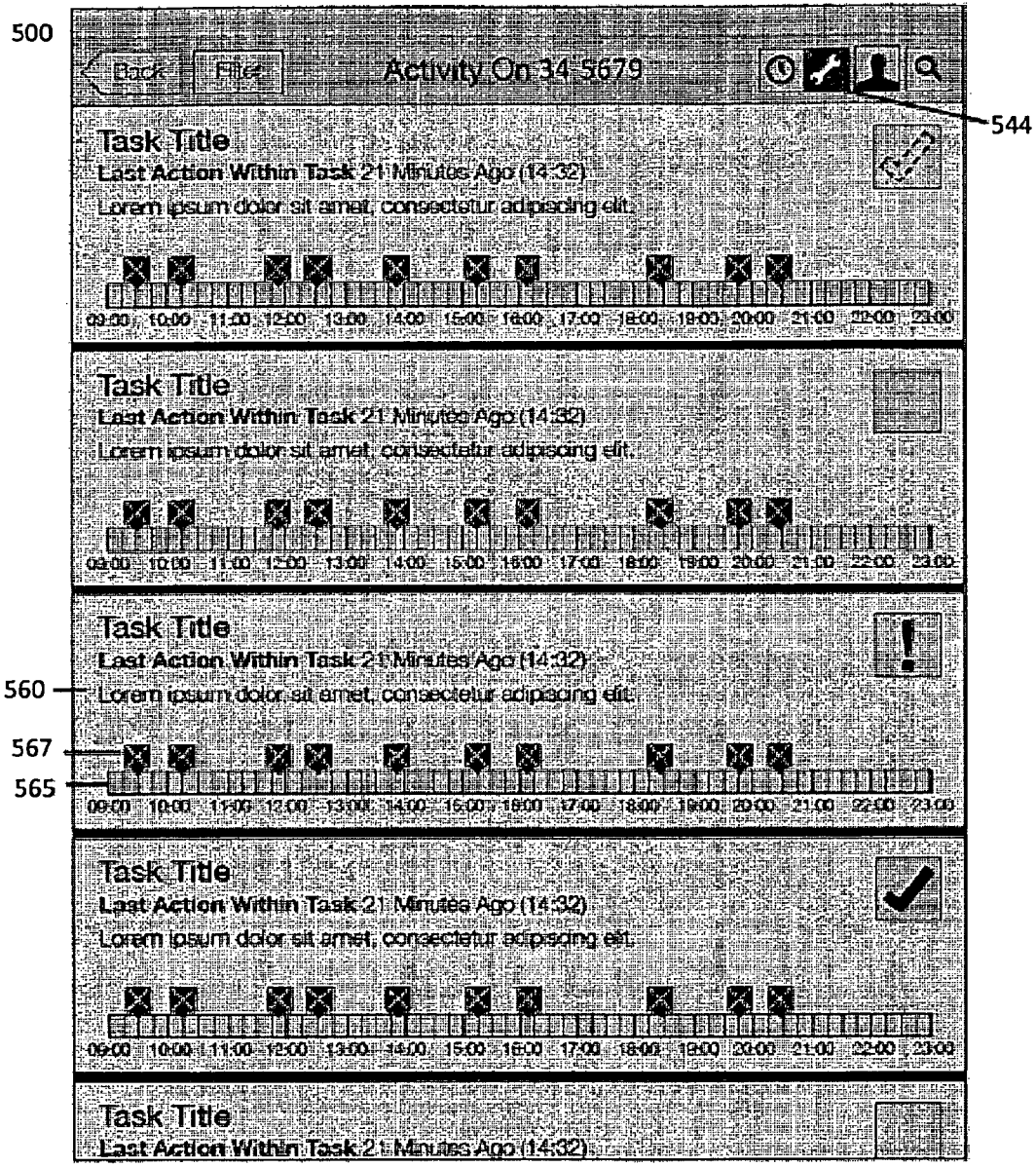
FIG. 5C is another exemplary collaboration screen display for a particular fleet unit, according to embodiments of the present disclosure.

On the other hand, if the user selects action button 544, application program receives an indication of this selection and displays the embodiment of screen display 500 shown in FIG. 5C, which may be referred to as an action-centric timeline display. In this embodiment, each of the thread elements, such as thread element 560, comprises a timeline 565, which shows the periods of activity on the MR task associated with thread element 560. Timeline 565 may comprise one or more entries, such as entry 567, each of which may include an icon identifying a specific action taken on the associated MR task at a specific time associated with the entry on timeline 565.

Returning to the embodiment of display 500 shown in FIG. 5A, if a user selects a thread element, the application program receives an indication of this selection and changes the screen display to show a list of the individual collaborative actions associated with the selected thread. For example, if the user selects thread element 520 of FIG. 5A, the application program will show display 600 of FIG. 6. Display 600 comprises one or more collaborative actions associated with thread element 520, including actions 610, 620, 630, 640, and 650. These actions can be arranged in any order desired by the user, but in some embodiments, they may be arranged by default in reverse chronological order, i.e., most recent at the top. Each of the actions may comprise an action type indicator, such as indicator icon 612 for action 610, which indicates that the action was a reference to a technical document.

In addition, display 600 also may include a thread continuation element 660. If the user selects thread continuation element 660, the application program receives an indication of this selection and creates a new action associated with the particular thread for which the previous actions are currently shown in display 600. Thread continuation element 660 also may comprise one or more continuation type elements, such as elements 661, 663, 665, 667, 669, and 671 shown in FIG. 6. Each of the continuation type elements corresponds to a particular type of action. For example, continuation type element 661 corresponds to an action of adding a text-based note to the selected thread (i.e., thread 520), and continuation type element 671 corresponds to an action of accessing a technical document related to the thread.

The application program may prompt the user to provide information associated with the new action selected by one of the continuation type elements, such as taking a picture (element 663), capturing a video (element 665) or audio (element 667), or initiating a chat help session (element 669). For example, the MR worker employing the user interface device could add an action by capturing an audio or video description of symptoms of the problem from crew members who were operating the fleet unit when the symptoms occurred, thereby improving the speed and accuracy of the problem discovery and diagnosis. Alternately, the MR worker may add an action by capturing an audio or video description of their own findings during discovery phase with the user interface device. The application program also may prompt the user to enter a textual description or metadata associated with the action. Once all of the information associated with the action is obtained from the user, the application program will display the new thread on display 600, ordered among the other threads according to the user's selected preference (e.g., at the top of the thread in the default reverse chronological order).

Figure 6:
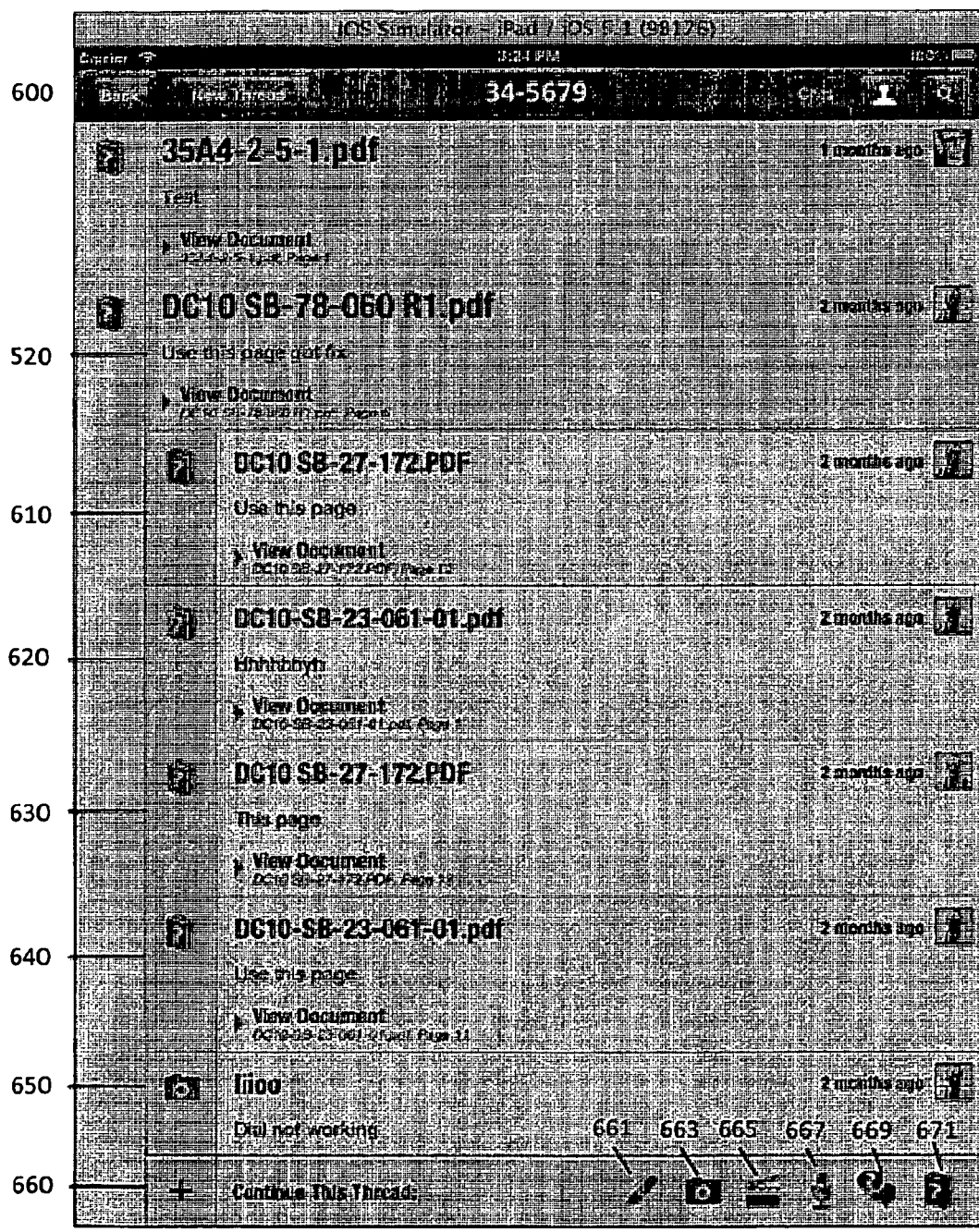
FIG. 6 is an exemplary screen display for a particular collaboration thread, according to one or more embodiments of the present disclosure.
Figure 7:
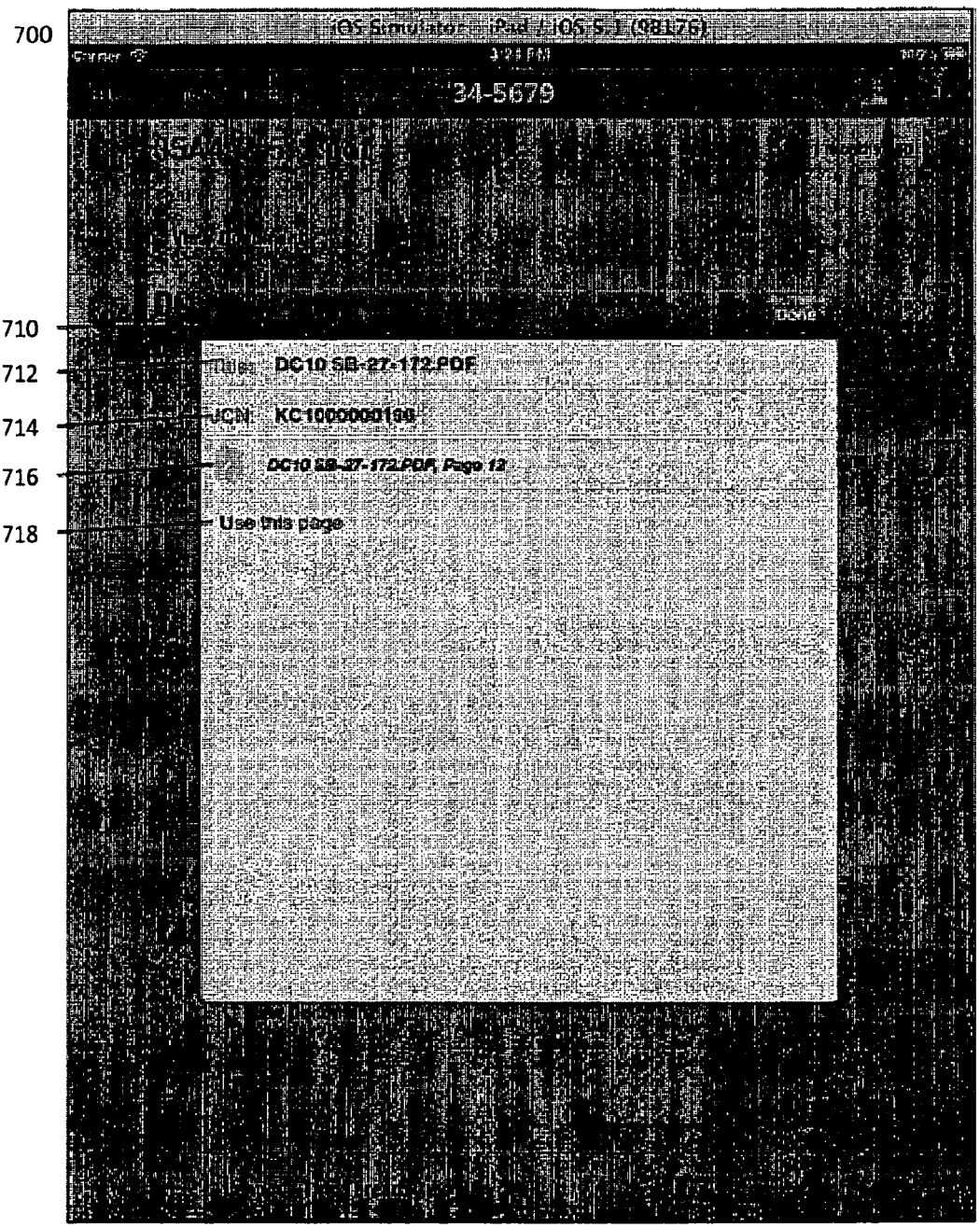
FIG. 7 is an exemplary screen display of action detail in a collaboration thread, according to one or more embodiments of the present disclosure.

The user also may review a previous action on the selected thread, e.g., thread 520 of FIGS. 5A and 6. If the user selects an action in a thread, the application program receives an indication of this selection and changes the screen display to show details of the selected action. For example, if the user selects action element 610 of FIG. 6, the application program will show display 700 of FIG. 7. Display 700 may comprise an action detail element 710, which may include various details about the previous action. Action detail element 710 may be displayed in various ways, such as by a pop-up window as shown in FIG. 7. Action detail element 710 may comprise various information fields, such as title 712, task identifier 714, reference data identifier 716, and user annotation 718.

Reference data identifier 716 may take various forms depending on the type of action. For example, if the action is related to adding multimedia information (such as performed by selecting continuation type elements 663, 665, and 667 of FIG. 6 when adding the action), then the reference data identifier may be the multimedia data itself (e.g., a photo) or a link to the multimedia data. In the example of FIG. 7, reference data identifier 716 comprises an identifier of the document and page that was accessed in the action and, optionally, a hyperlink to this particular document and page.

In some embodiments, if the user selects the reference data identifier, the application program receives an indication of this selection and may change the screen display to show the reference data associated with the identifier. For example, if the user selects reference data identifier 716 of FIG. 7, the application program will cause the user interface device to show display 800 of FIG. 8. In this example, display 800 comprises a document display frame 810 in which the document page identified by reference data identifier 716 is displayed. The document page may comprise text, images, graphics, etc.

In some embodiments, the application program may determine whether to display the document in document display frame 810 based on the size of the document, whether the document (or the most current version) is currently stored on the user interface device and, the type of communication link available to the user interface device. For example, the application program may decide not to display the document in frame 810 if the document exceeds a certain size threshold (e.g., pages, megabytes, etc.), the document (or the most current version) is not stored on the user interface device, and the user interface device is out of range of a WiFi connection and/or only has a cellular connection available. In some embodiments, if the application program determines not to display the document, it may instead display a message in display frame 810 indicating that the document will not be displayed, and the reason for not displaying the document. In some embodiments, the application program may provide a notice to the user (e.g., of long download time) when the document exceeds a certain size threshold or is within a certain range of sizes. In such case, the application program may continue to download the document or prompt the user for authorization to download before doing so.

In some embodiments, after user selection of a reference data identifier (e.g., reference data identifier 716 in FIG. 7) but prior to displaying the corresponding document in frame 810, the application program may automatically query a reference data server to obtain the date of the latest version of the document. If the date of the latest version of the document matches the date of a version stored in the memory of the user interface device, the application program may display in frame 810 the version of the document stored in memory, along with a version indicator, such as version indicator 815, indicating that the displayed document is up-to-date. Otherwise, if the application program determines that the version stored on the device is out-of-date (or that no version is stored on the device), it displays a version indicator 815 (e.g., an appropriate icon or a message) indicating this information and continues with obtaining the document from the server in the manner described above. If the application program is unable to download the latest version of the document from the server, but an earlier version is stored in the device's memory, the application program may display the earlier version together with version indicator 815, which indicates that the displayed version is out-of-date.

Display 800 also comprises a page information element 820 and a document heat map element 830. Page information element 820 comprises the current page number (e.g., 12) and the number of pages in the document (e.g., 18). Page information element 820 also comprises annotation count 822, which indicates the number of times this page has been annotated during the course of MR operations, and zoom count 824, which indicates the number of times a user has zoomed into this page.

Figure 8:
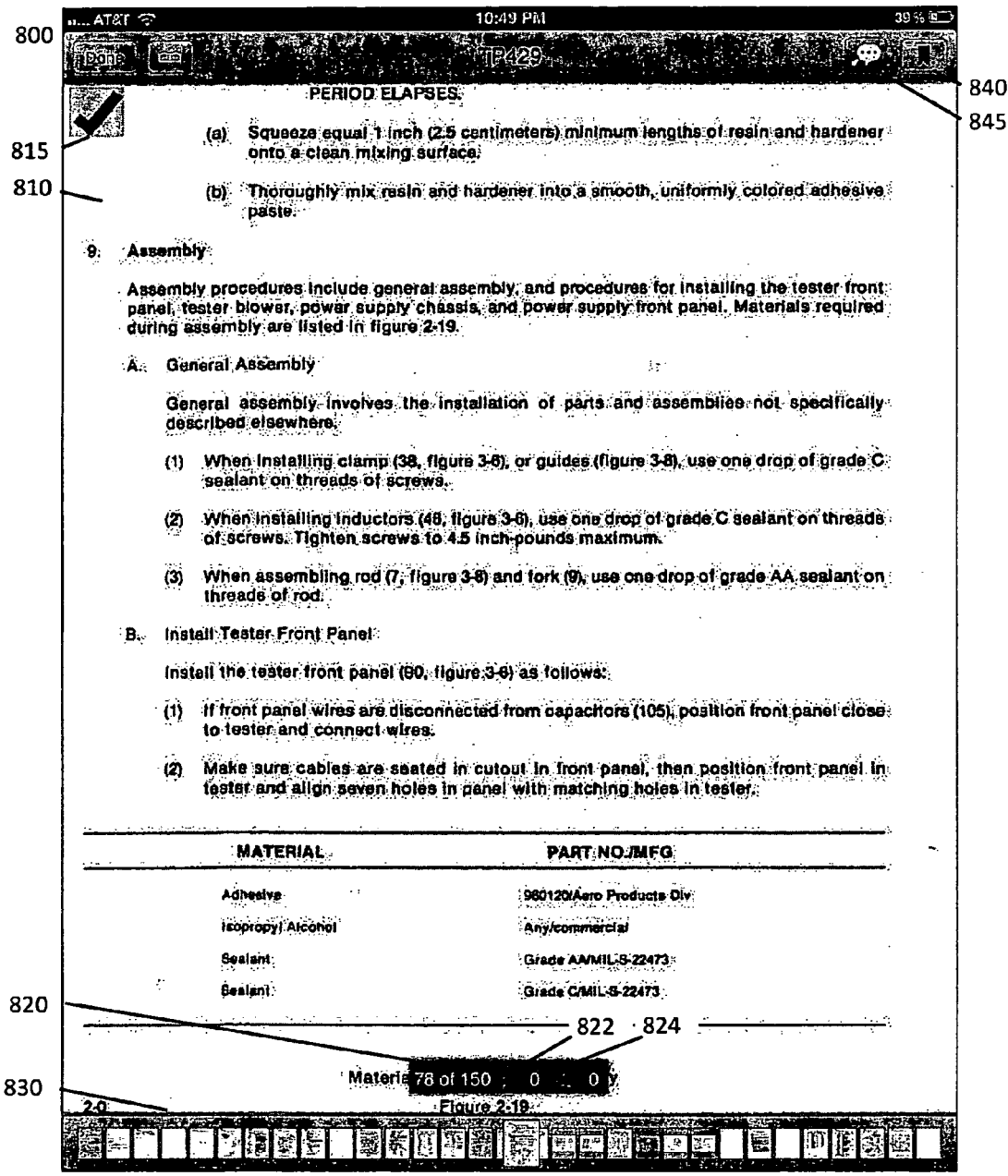
FIG. 8 is an exemplary screen display of a document associated with an action in a collaboration thread, according to one or more embodiments of the present disclosure.

Document heat map 830 comprises representations of each of the pages of the document, such as the exemplary thumbnails shown in FIG. 8. In the case where the document comprises a large number of pages, the page representations may be for ranges of pages rather than individual pages. The page representation corresponding to the page currently displayed in frame 810 may be differentiated from the other page representations in some way, such as by the enlargement of the representation of page 12 shown in FIG. 8. The colorization or shading of each of the representations comprising document heat map 830 may be determined from a page rank algorithm based on the number of times the particular page (or page range, as the case may be) has been zoomed, annotated, bookmarked, etc. Each of these operations may be weighted the same or differently by the page rank algorithm. The colorization scheme of the heat map may be based on a single base color (e.g., blue), with the particular shade of the base color assigned to the representation of a particular page (or range) determined by the page rank, e.g., the higher the page rank, the brighter the shade. Other embodiments may use multiple base colors (e.g., multiple primary colors, such as green and red) along with multiple shades of each base color to represent the range of possible page ranks. In other embodiments, multi-color patterns may be used to represent a more complex page rank statistic.

Although FIGS. 7 and 8 illustrate embodiments relating to the selection and display of documents containing textual information (e.g., PDF files), persons of ordinary skill will understand and appreciate that the similar selection and display methods can be utilized with respect to many different types of documents, including images, audio, and video. For example, title 712 in FIG. 7 may refer to a particular video document, e.g., an instructional video. If the video document is selected by the user in the manner described above, the application program will render display 800 including document frame 810 comprising an image from the selected video document, e.g., the initial title screen. In this case, page information element 820 may comprise an indication of the relative timing of the displayed image within the video (e.g., "0:00 of 5:30"). Likewise, document heat map 830 may comprise thumbnails such as shown in FIG. 8, but in this case each thumbnail may correspond to a portion of the video document (e.g., a chapter or segment), with the thumbnails shaded based on the popularity of the particular portion in the same or a similar manner as described above.

Figure 9:
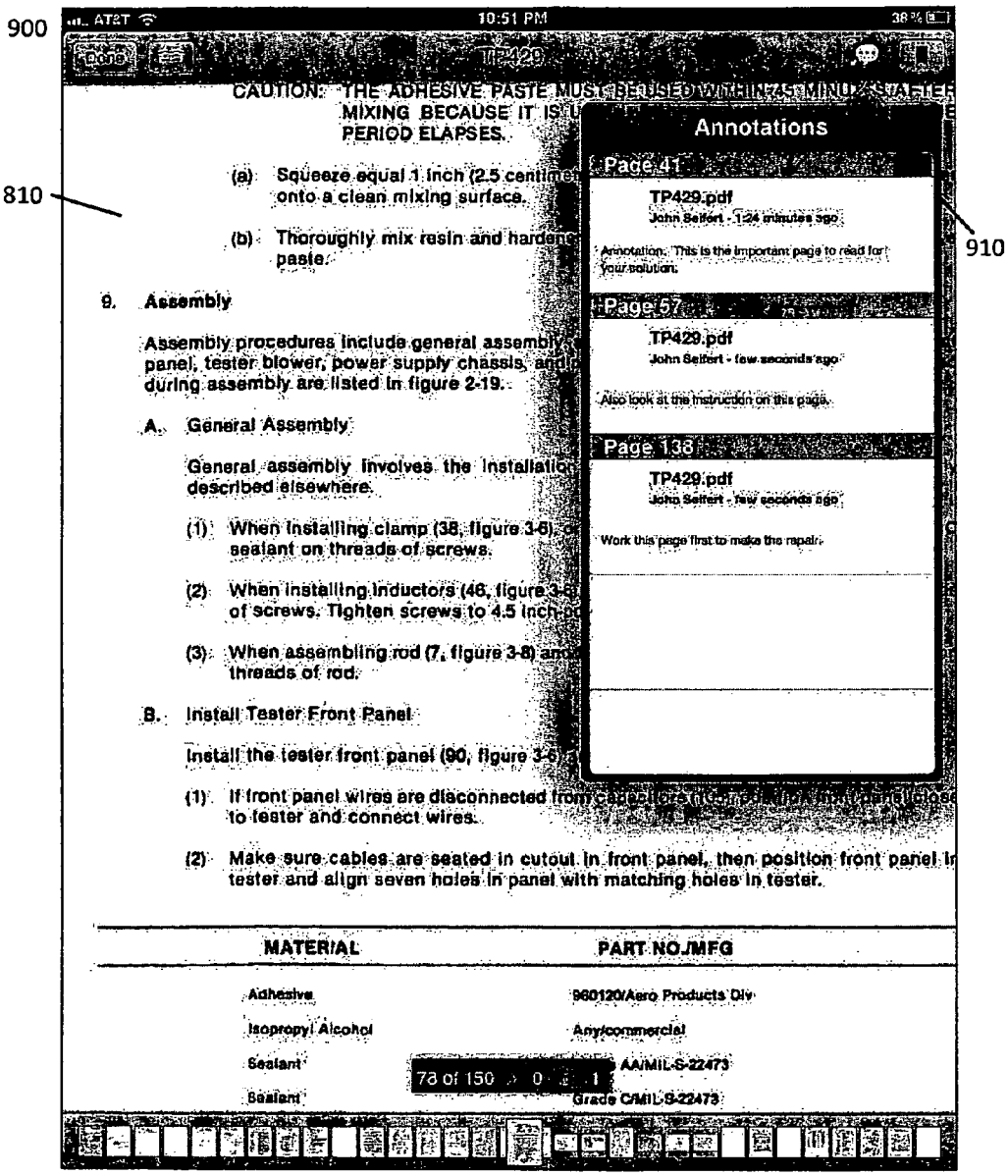
FIG. 9 is an exemplary screen display of a list of annotations in document associated with an action in a collaboration thread, according to one or more embodiments of the present disclosure.

Display 800 also may comprise one or more user action buttons, including bookmark button 840 and annotation button 845. These action buttons may be located in the upper right-hand corner of display 800, such as shown in FIG. 8, although persons of ordinary skill will recognize that other locations for the action buttons are possible. If the user selects annotation button 845, the application program receives an indication of this selection and will cause the user interface device to show display 900 shown in FIG. 9. In addition to the document display frame 810 of display 800 shown in FIG. 8, display 900 comprises an annotation history frame 910. This display element comprises a list of the annotations to the document currently being viewed in document display frame 810. These annotations may be arranged in any order, including ascending by page number, reverse chronological, etc. Each annotation in the list may comprise a textual note related to a particular page, e.g., an explanatory note clarifying instructions found on that page. Referring back to FIG. 8, if the user selects bookmark button 840, the application program receives an indication of this selection and will cause the device to show a display similar to display 900, except comprising a bookmark list rather than annotation list 910. Either a bookmark list or an annotation list may be display in various ways on display 900, such as a menu list (e.g., annotation list 910), a pop-up window similar to display element 710 in FIG. 7, or in other ways known to persons of ordinary skill in the art.

Figure 10:
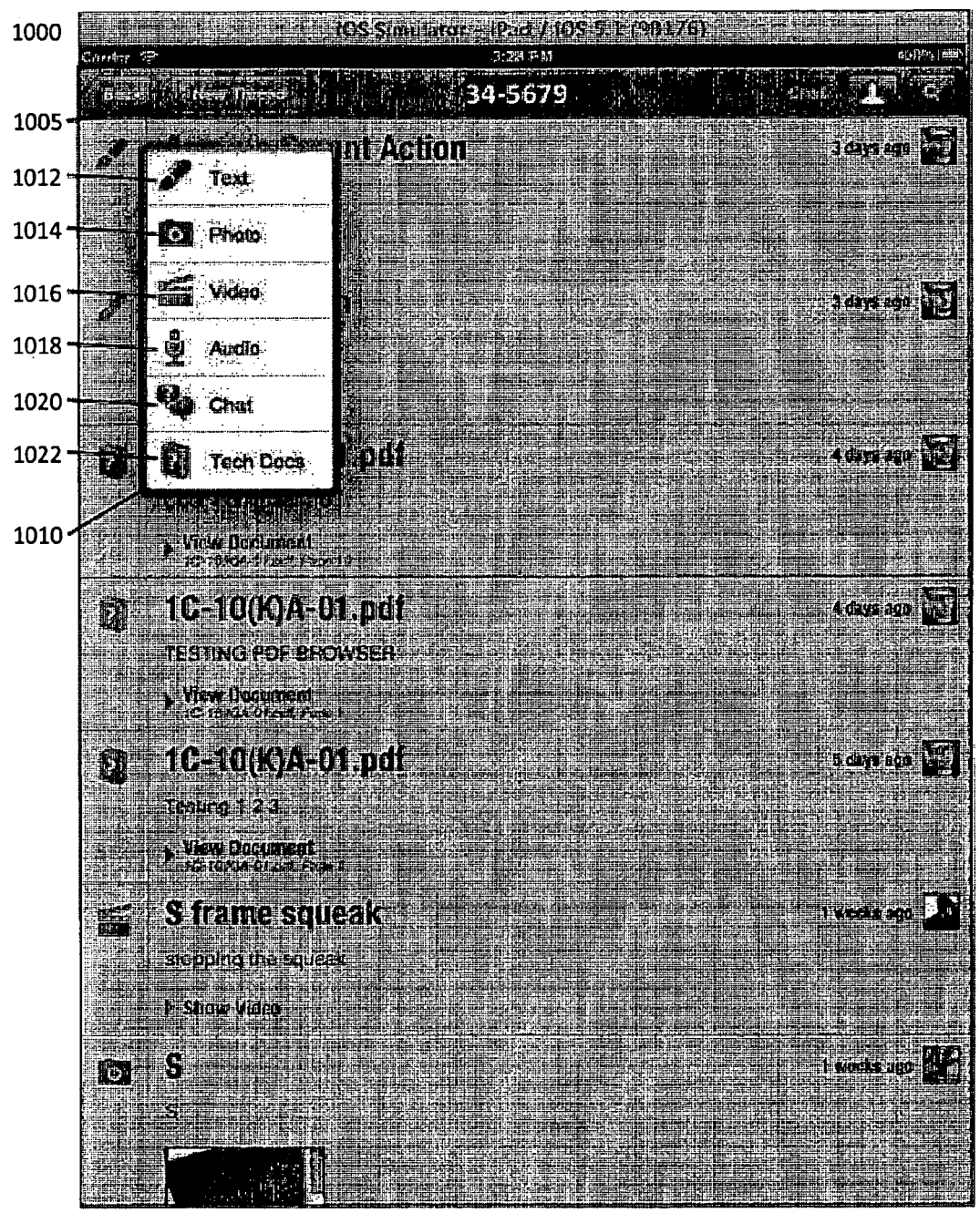
FIG. 10 is an exemplary collaboration screen display for adding a new collaboration thread pertaining to a particular fleet unit, according to one or more embodiments of the present disclosure.

Referring back to the embodiment shown in FIG. 5A, if the user selects thread action button 505, the application program receives an indication of this selection and creates a new collaboration thread associated with the particular fleet unit shown in display 500. For example, if the user has selected collaboration 440 in FIG. 4, this will cause the application program to change the screen display to show display 1000 of FIG. 10, which is a list of thread elements associated with collaboration 440 (i.e., fleet unit 34-5678). Display 1000 further comprises thread action button 1005, which has the same functionality as thread action button 505 of FIG. 5. If the user selects thread action button 1005, the application program receives an indication of this selection and displays drop-down thread type list 1010. This list may comprise a plurality of thread action type elements, such as elements 1012, 1014, 1016, 1018, 1020, and 1022, each of which corresponds to a particular type action to start the new thread.

Figure 11:
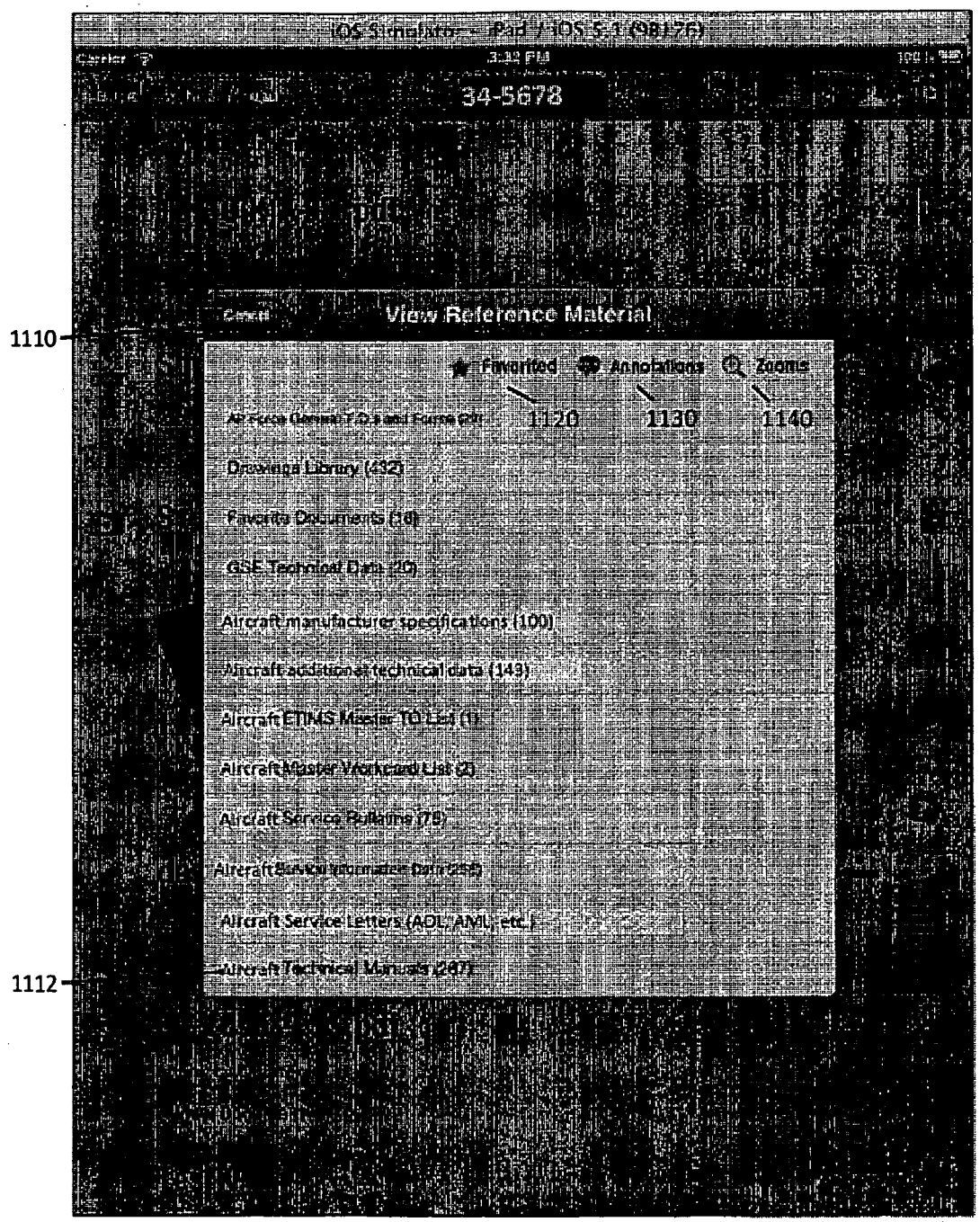
FIG. 11 is an exemplary collaboration screen display showing a categories of documents that can be viewed as part of a collaboration thread pertaining to a particular fleet unit, according to one or more embodiments of the present disclosure.

For example, if the user selects element 1022 of list 1010, this will cause the application program receives an indication of this selection and starts the new thread with a user access to a reference document. More specifically, this will cause the application program to change the display of the user interface device to display 1100 of FIG. 11. Display 1100 comprises a document directory frame 1110 which displays a list of the types, categories, etc. of reference documents available. Document directory frame 1110 also may include the number of documents for each type, category, etc. Document directory frame 1110 further comprises one or more document statistics indicators, such as indicators 1120, 1130, and 1140 corresponding to the number of documents favorited (e.g., selected as a "favorite" document by a user), annotated, and zoomed, respectively, within each document type or category. The values for each of these indicators may be displayed automatically in frame 1110, or may be displayed only upon selection by the user of the particular indicator.

If the user selects document type 1112 ("KC-10 Technical Manuals") from the list in document directory frame 1110, the application program receives an indication of this selection and changes the screen display of the user interface device to show a list of subtypes or subcategories within the selected document type 1112. If the user further selects a particular document subtype or subcategory (e.g., "Maintenance Manuals"), the application program will change the screen display of the user interface device to show display 1200 of FIG. 12. Display 1200 comprises a list of the documents within the selected subtype within selected document type 1112, including document 1210. Display also comprises action button 1230, which if selected by the user will cause the application program to return to the display of document subtypes. Document 1210 comprises a document name and one or more document statistics, such as document statistics 1212, 1214, 1216, and 1218 shown in FIG. 12. Document statistics 1212, 1214, and 1216 correspond to the number of times document 1210 has been favorited, annotated, and zoomed, respectively. Document statistic 1218 indicates the approximate size of document 1210. Document statistics 1212 through 1218 are merely exemplary, and either a subset of these document statistics, or additional document statistics, may be shown for document 1210 or any other documents listed in display 1200. Moreover, in some embodiments, one or more listed documents may have different document statistics displayed than other listed documents. When the user selects a document listed in display 1200, the application program receives an indication of this selection and displays that document on the display screen, such as shown in FIG. 8. As discussed above, the documents listed in and selected from display list 1200 may include files comprising text, images, audio, and video, or combinations thereof, with the type of file indicated by file name, file extension, type description (e.g., "MPEG4 video"), type icon, or some other manner known to persons of ordinary skill.

Referring back again to FIG. 1, display element Tech Doc Library 130 comprises a list of previously accessed technical documents. This display may be arranged in any order selected by the user, but in some embodiments, the default may be reverse chronological order. In some embodiments, when the user selects one of the previously accessed technical documents shown in the list, the application program receives an indication of this selection and changes the display screen to show the selected document (e.g., page 1 of a multi-page document). Tech Doc Library element 130 further comprises display selection icons 132 and 134. When the user touches the screen area corresponding to display selection icon 134, the application program changes the display of the user interface device to show a list of documents available for the fleet unit, e.g., the list of document categories shown in document directory frame 1110 of display 1100 of FIG. 11. The user may select particular categories, subcategories, and documents from this list in the manner described above with reference to FIGS. 11 and 12.

Figure 13:
FIG. 13 is an exemplary screen display showing a 3D model representing the type of fleet unit subject to maintenance or repair, according to one or more embodiments of the present disclosure.
Figure 14:
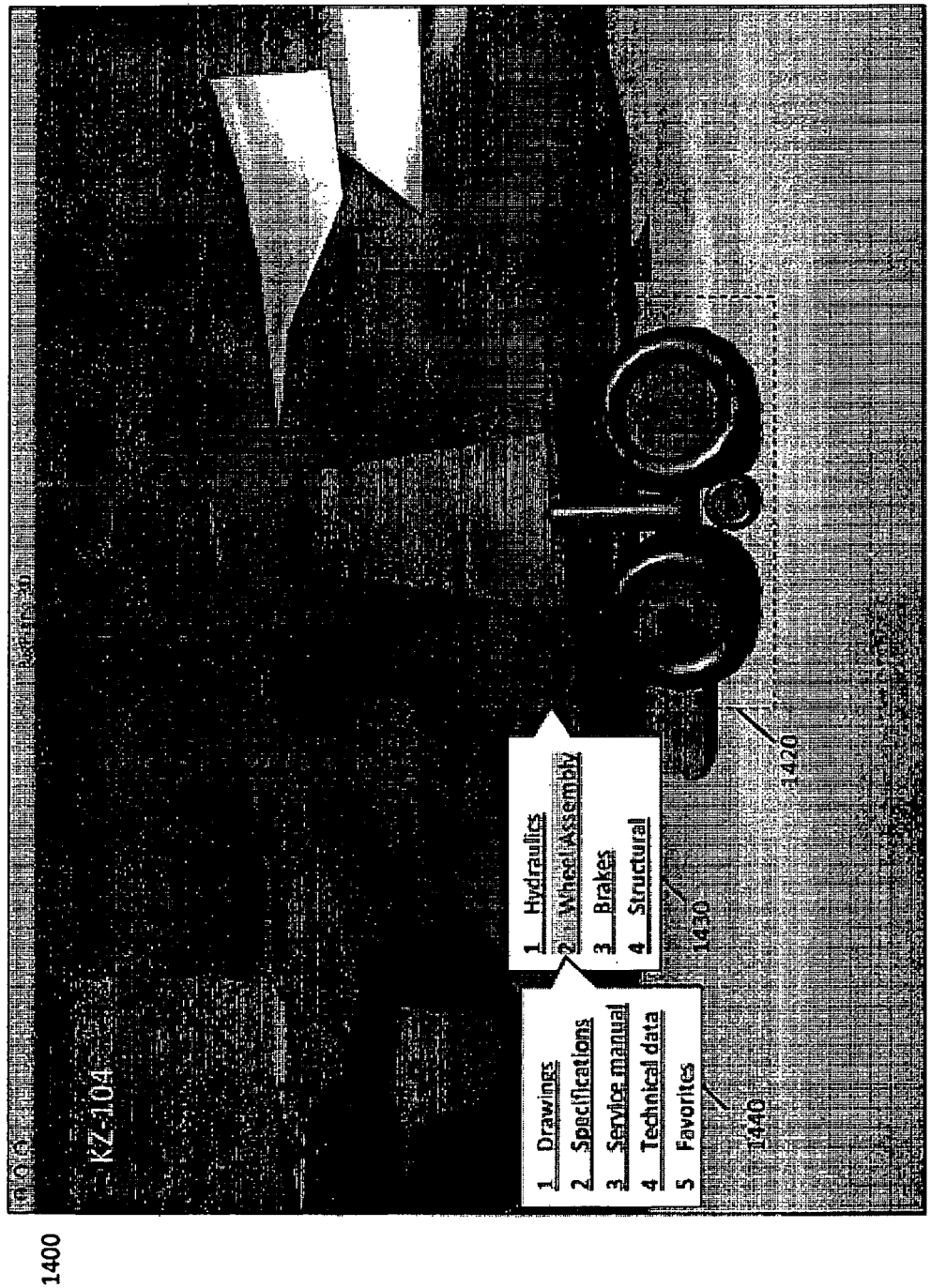
FIG. 14 is another exemplary screen display showing a different view of the 3D model representing the type of fleet unit subject to maintenance or repair, according to one or more embodiments of the present disclosure.

On the other hand, when the user selects display selection icon 132, the application program receives an indication of this selection and changes the display of the user interface device to show the display 1300 shown in FIG. 13. Display 1300 comprises visual representation 1320 (e.g., a three-dimensional (3D) model) of the type of equipment (e.g., KC-10 aircraft) subject to maintenance or repair. Display 1300 may further comprise an identifier 1340 of the type of equipment shown in visual representation 1320. The user may apply various finger gestures to the touch screen display of the user interface device, which will cause the application program to manipulate the display of visual representation 1320 by, e.g., scaling (zooming), panning, rotating about an axis, etc. Any number of different single- or multi-finger gestures may be chosen to correspond to a particular manipulation, although certain choices may be preferred due to their familiarity to users of the user interface device (e.g., pinch two fingers to zoom out, spread two fingers to zoom in) or to persons of ordinary skill in the art. Accordingly, the user may manipulate the visual representation 1320 which causes application program to update the display of the user interface device to show the desired portion of the equipment, e.g., the area surrounding the KC-10's left landing gear as shown in display 1400 of FIG. 14.

In some embodiments, the user may select the area of the equipment for which documentation is needed by touching a corresponding point on visual representation 1320 shown on the touch screen display. For example, if the user wants documentation about the KC-10's left landing gear, the user may select that area of the plane by touching a corresponding point near the landing gear shown in display 1400 of FIG. 14. The application program receives an indication of this selection and displays a documentation region indicator 1420, which indicates an area of the display to which the application program has assigned the user's selective touch. Each display of the visual representation, such as displays 1300 and 1400, may be broken into any number of documentation regions, which correspond to non-overlapping physical regions of the equipment. The various documentation regions may be fixed independent of the scale or portion of the visual representation shown on the display, or sizes of documentation regions may vary depending on the display scale. In other words, the number of documentation regions in any particular visual representation—regardless of the scale—may be more or less constant.

In addition to displaying documentation region identifier, the application program may also display a drop-down menu 1430 of mechanical, electrical, structural, or other types of elements found in the physical region selected by the user. For example, when the user selects the display area associated with documentation region indicator 1420, the application program receives an indication of this selection and displays drop-down menu 1430 comprising the exemplary choices of hydraulics, wheel assembly, brakes, and structural. Other types, styles, and formats for displaying a list of choices will be apparent to persons of ordinary skill in the art. Selecting one of the items (e.g., wheel assembly) from menu 1430 will cause the application program to display a sub-menu 1440 comprising the types of documentation available for the selected physical element. Sub-menu 1440 may comprise some portion of the categories of documents shown in document directory frame 1110 in display 1100 of FIG. 11. Additionally, sub-menu 1440 may comprise a category corresponding to "favorite" documents related to the selected physical element; this category documents may comprise documents identified by the current user, a selected subset of other users, or all users of the collaboration system.

Figure 12:
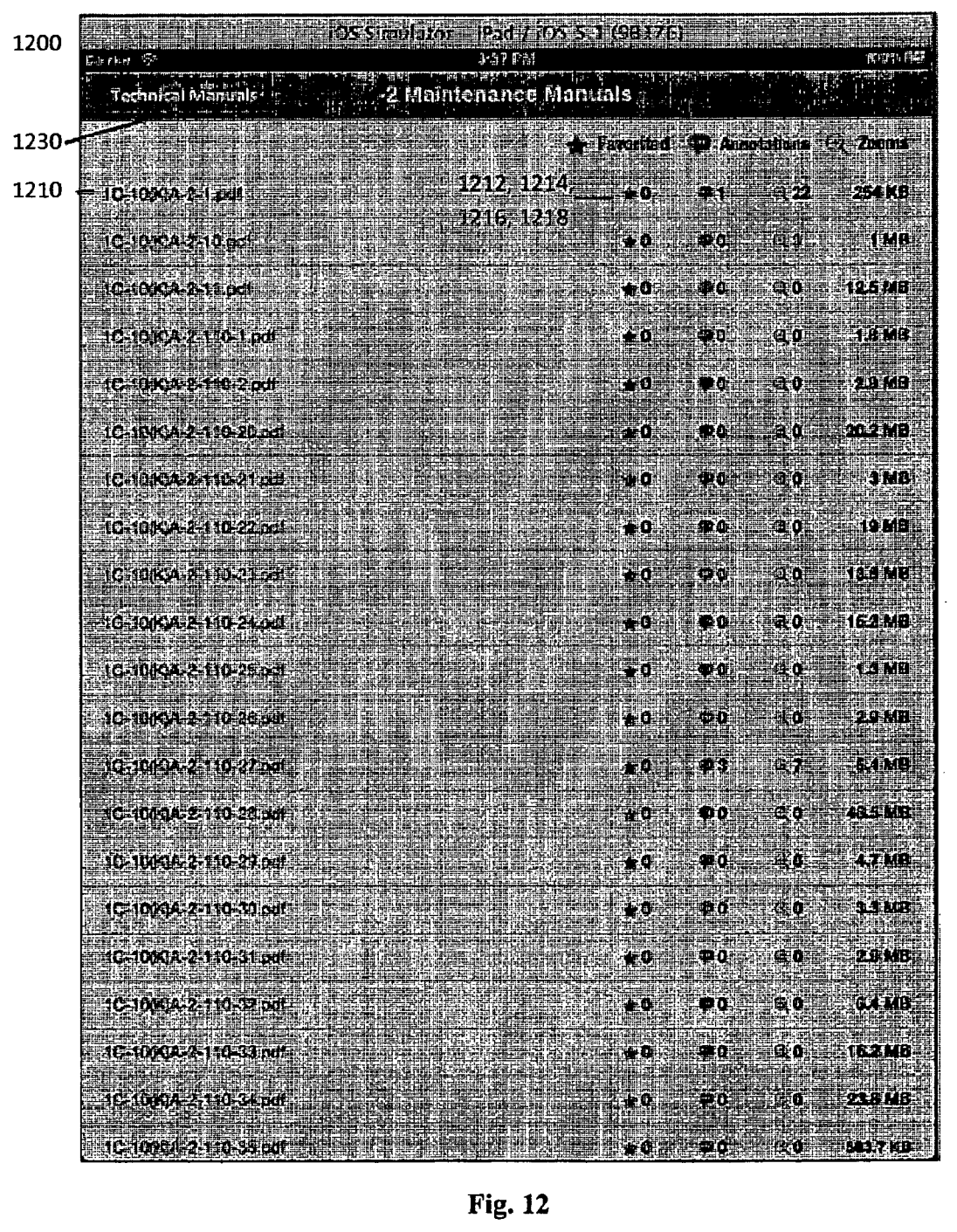

User selection of a category from sub-menu 1440 may cause the application program to display one or more documents within the category, such as shown in FIG. 12. In other embodiments, selecting a category from sub-menu 1440 may cause the application program to display one or more subcategories, as described above with reference to FIGS. 11 and 12. The user may select physical elements, categories, sub-categories, and documents by any manner known to persons of ordinary skill in the art.

Figure 15:
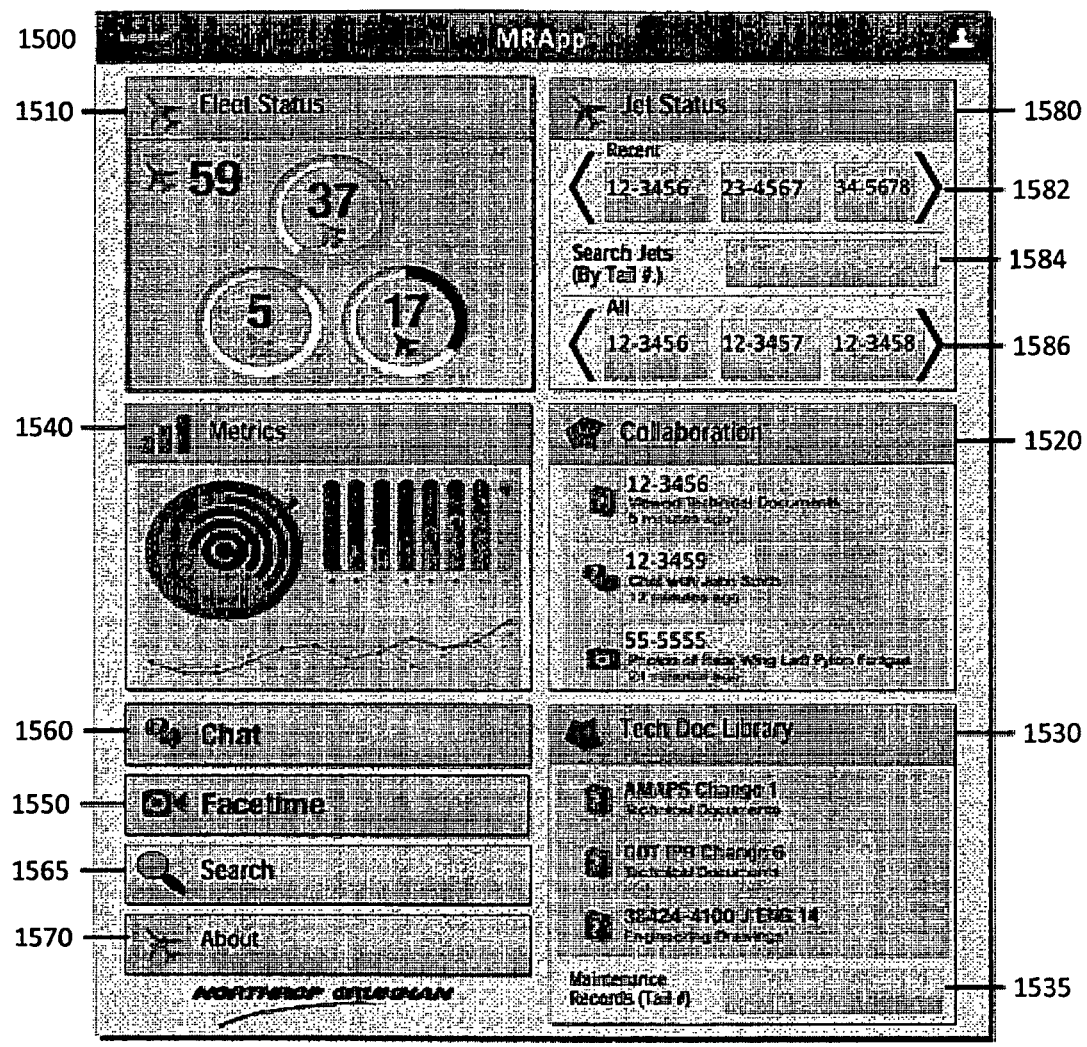
FIG. 15 is another exemplary home screen display rendered by an application program executing on a user interface device, according to one or more embodiments of the present disclosure.

FIG. 15 shows an alternate home screen display rendered by an application program executing on a user interface device, according to embodiments of the present disclosure. Display 1500 comprises several main display elements including Fleet Status 1510, Collaboration 1520, Tech Doc Library 1530, Metrics 1540, Facetime 1550, Chat 1560, About iFleet 1570, and Jet Status 1580. Each display element occupies a clearly defined area of display 1500, such that when a user of the user interface device touches the screen within a particular area (e.g., within the boundaries of Fleet Status 1510) to select the corresponding element, the application program receives an indicator of the selection and executes a corresponding action, such as displaying another screen corresponding to the selected element. The elements Fleet Status 1510, Collaboration 1520, Tech Doc Library 1530, Metrics 1540, Facetime 1550, and Chat 1560 comprise similar functionality as the respective elements with the same names shown in and described above in reference to FIG. 1. However, these particular element names are chosen for purposes of illustration only, and are not intended to limit the spirit or scope of the present disclosure in any way.

Tech Doc Library 1530 also comprises an additional records search field 1535, in which a user can enter the unit identifier for a fleet unit (e.g., aircraft tail number) and initiate a search for all MR records related to that identifier. When the user selects the element About iFleet 1570, this will cause the application program to display various information about itself on the touch screen display, such as version, date released, copyright, etc. Similarly, a user selection of Search 1565 causes the application program to display a search field, in which the user can enter any term and initiate a search for that term through all (or a user-selected group of) documents in the MR system. Other variations of functionality for Search 1565 and records search field 1535 will be apparent to persons of ordinary skill in the art.

Display 1500 also comprises a Jet Status element 1580 that provides various ways for users to view and search for the status of a particular fleet unit (e.g., aircraft tail number). In the embodiment shown in FIG. 15, Jet Status 1580 comprises a recent status list 1582, an all status list 1586, and a identifier entry field 1584. The recent status list 1582 shown in FIG. 15 comprises a list of the three most recent status searches performed by the user or, alternately, by all users associated with the MR operation. An identifier of the particular fleet unit is displayed for each entry on the list. Recent status list 1582 also comprises scroll bars (shown on either side of the list). By pressing on the touch screen display in the area of a scroll bar, the user can cause the application program to shift the three-search list to display searches that occurred earlier (or later, as the case may be) in time. The all status list 1586 comprises similar functionality as the recent status list 1582, with the exception that the list is arranged in numerical order (ascending or descending) by fleet unit identifier. The user can select an entry on either the recent status list 1582 or all status list 1586 by touching the rectangular region of the screen corresponding to the desired entry. Similarly, the user can enter an identifier for a desired unit in the identifier entry field 1584. Any of these three user actions will cause the application program to display a screen with status information for the desired fleet unit. The application program will also update the recent status list 1582 with information related to this status search. In some embodiments, the application program also updates the collaboration record corresponding to the unit identifier with information related to this status search.

Figure 16:
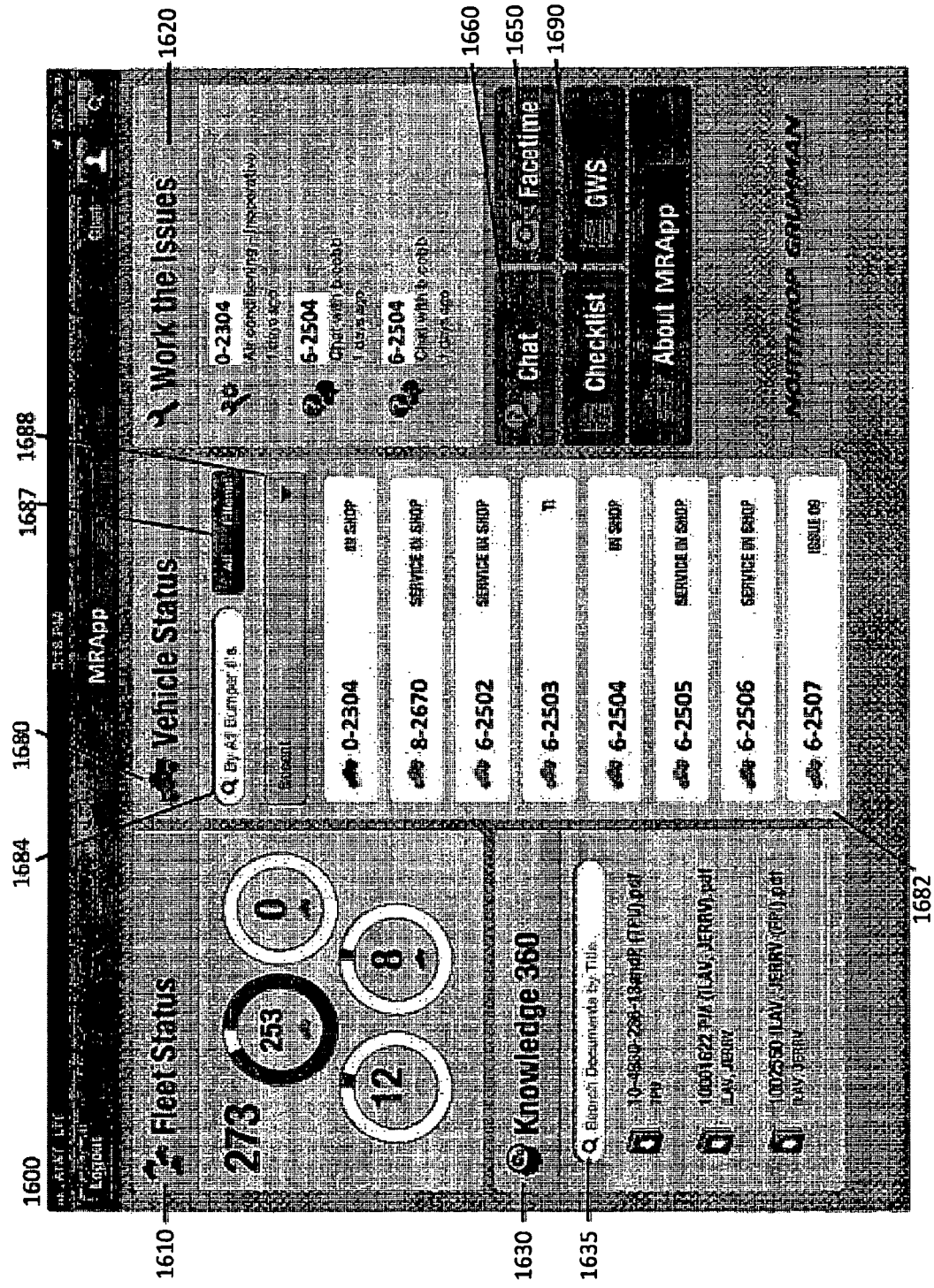
FIG. 16 is another exemplary home screen display rendered by an application program executing on a user interface device, according to embodiments of the present disclosure.

FIG. 16 shows another exemplary home screen display rendered by an application program executing on a user interface device, according to embodiments of the present disclosure. Rather than being rendered in portrait mode like home screen displays 100 and 1500 shown in FIGS. 1 and 15, respectively, display 1600 is rendered in landscape mode. Display 1600 comprises several main display elements including Fleet Status 1610, Work the Issues 1620, Knowledge 360 1630, Facetime 1650, Chat 1660, Vehicle Status 1680, and Checklist 1690. Each display element occupies a clearly defined area of display 1600, such that when a user of the user interface device touches the screen within a particular area (e.g., within the boundaries of Fleet Status 1610) to select the corresponding element, the application program receives an indicator of the selection and executes a corresponding action, such as displaying another screen corresponding to the selected element. The elements Fleet Status 1610, Facetime 1650, and Chat 1660 comprise similar functionality as the respective elements with the same names shown in and described above in reference to FIGS. 1 and 15. In addition, element Work the Issues 1620 comprises similar functionality as Collaboration 1520 shown in and described above with reference to FIGS. 1 and 15. Also, element Knowledge 360 1630 comprises similar functionality as Tech Doc Library 1530 shown in and described above with reference to FIGS. 1 and 15, including a records search field 1635 in which a user can enter the unit identifier for a fleet unit and initiate a search for all maintenance records related to that unit. However, these particular element names are chosen for purposes of illustration only, and are not intended to limit the spirit or scope of the present disclosure in any way.

Vehicle Status 1680 of display 1600 provides various ways for users to view and search for the status of a particular fleet unit. In the embodiment shown in FIG. 16, Vehicle Status 1680 comprises a status list 1682, an identifier entry field 1684, a filter selector 1687, and a sort selector 1688. If the user selects the "All" setting of the filter selector 1687, this will cause the application program to ignore the identifier entry field 1684 and retrieve status information about all fleet units whose records have been accessed by the user. This status information may be presented to the user in various orders depending on the setting of sort selector 1688. For example, the "Recent" setting shown in FIG. 16 will cause the application to display the status list 1682 in reverse chronological order (i.e., latest on top) of when the user last contributed to the respective records. Sort selector 1688 may include other settings that are selectable by the user, e.g., by touching the screen in the area corresponding to sort selector 1688 and choosing from among displayed options. Such options may include "Recent by anyone," which will cause the application to display status list 1682 in reverse chronological order of when any user last contributed to the respective records; "Recent view," which will cause the application to display the status list 1682 in reverse chronological order of when the user last viewed the respective records; and "Most activity," which will cause the application to display status list 1682 in order of the number of accesses of their respective records (e.g., most accessed on top).

In some embodiments, sort selector 1688 may comprise a "By Location" option, the selection of which by the user will cause the application to display status list 1682 in an order related to the distance from the user's present location, with closer units being shown before more distant units. In some embodiments, such distance-based sorting may not be an explicit option in sort selector 1688 but rather is an additional sort criterion in other explicit options.

On the other hand, if the user selects the "Filter" setting of filter selector 1687, this will cause the application to prompt the user to enter a unit identifier in the identifier entry field 1684. The application may prompt the user, for example, with a blinking cursor in field 1684, or by other methods known to persons of ordinary skill. Once the user enters a valid identifier, the application will display status information about the fleet unit corresponding to the identifier in status list 1682.

Figure 17:
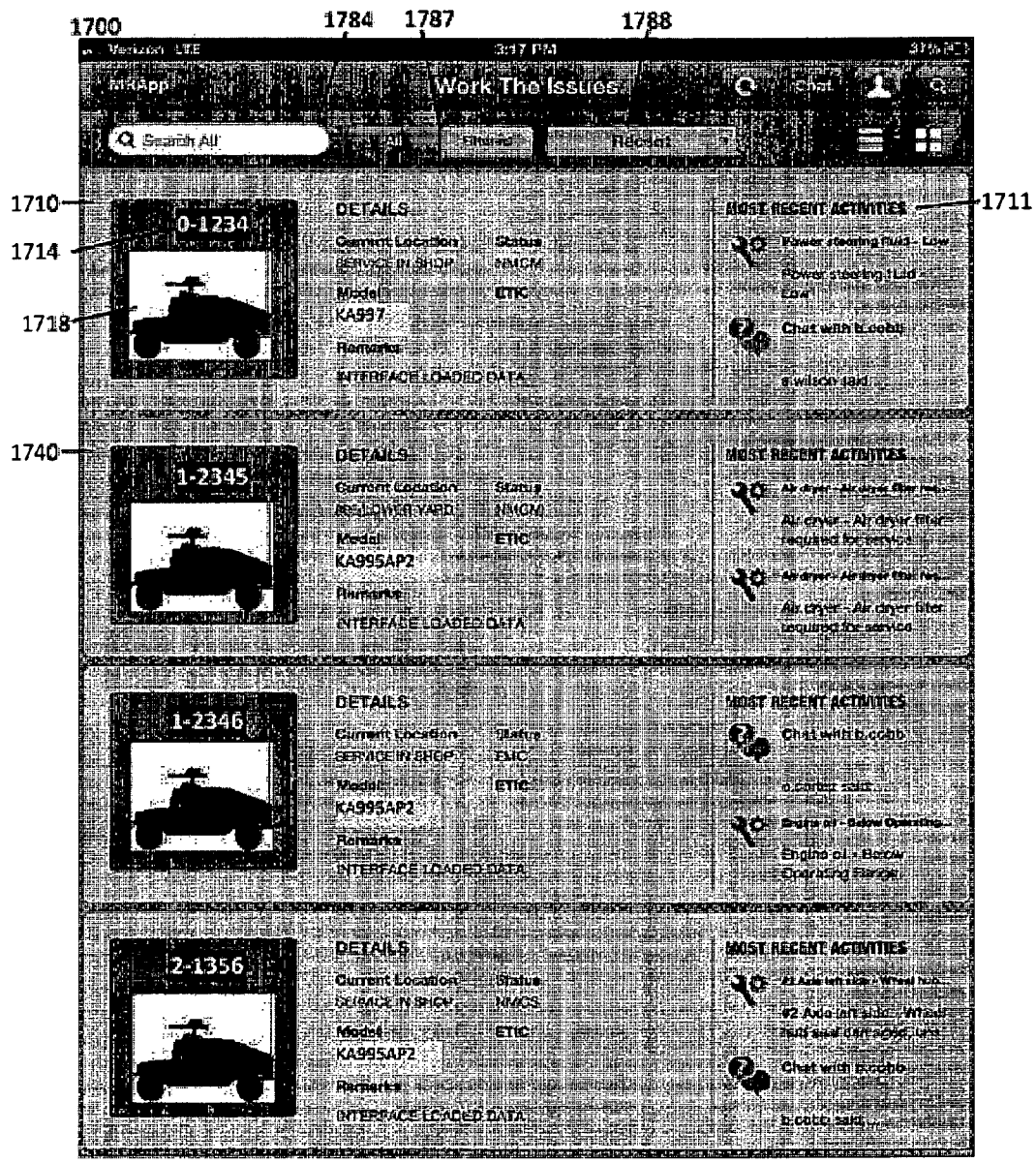
FIG. 17 is another exemplary collaboration screen display, according to one or more embodiments of the present disclosure.

When a user selects Work the Issues 1620, the application program receives an indication of the user selection and renders a collaboration screen display, such as display 1700 shown in FIG. 17. Display 1700 comprises a list of collaboration display elements, including collaborations 1710 and 1740, which may be arranged in any order such as by ascending (or descending) numerical order of equipment or unit identifier, chronologically, reverse chronologically, etc. The user also may scroll up and down through collaborations, e.g., by swiping a finger vertically on the area of the screen displaying the listing of collaborations. Each of the collaboration display elements, such as collaborations 1710 and 1740, may represent one or more collaborative threads associated with a particular fleet unit (e.g., collaboration 1710 associated with unit 5325), with each collaborative thread pertaining to a different MR issue related to that particular fleet unit.

Each collaboration display element comprises several sub-elements, such as equipment identifier 1714 and equipment status indicator 1718 associated with collaboration 1710. In some embodiments, the equipment status indicator is displayed as an icon representative of the type of equipment (e.g., armored vehicle) and is colored according to the status of the individual fleet unit, using the same color scheme used in the Fleet Status 110 element shown in FIG. 1. Also associated with each collaboration is a most recent activities list, such as most recent activities list 1711 associated with collaboration 1710. Each recent activities list comprises one or more of the most recent activities related to one or more collaboration threads pertaining to the particular fleet unit. For example, recent activities list 1711 comprises two activities pertaining to fleet unit 5325: a chat and a service request. The number of activities shown in each recent activities list may be determined in various ways. In some embodiments, the number of activities shown may be fixed or configurable to one or more discrete values, e.g., by menu selection. In other embodiments, the number of activities shown may be determined based on the space required for the individual activities and the total space provided for the fleet unit or collaboration.

Display 1700 also may comprise one or more user action buttons such as the action buttons shown in the upper-right-hand corner, which have the same or similar functionality as corresponding action buttons 420, 425, 430 and 435 shown in and described above with reference to FIG. 4. Display 1700 may also include an identifier entry field 1784, a filter selector 1787, and a sort selector 1788. The operation of these fields is substantially the same as the operation of fields 1684, 1687, and 1688 described above with reference to FIG. 16.

Figure 18A:
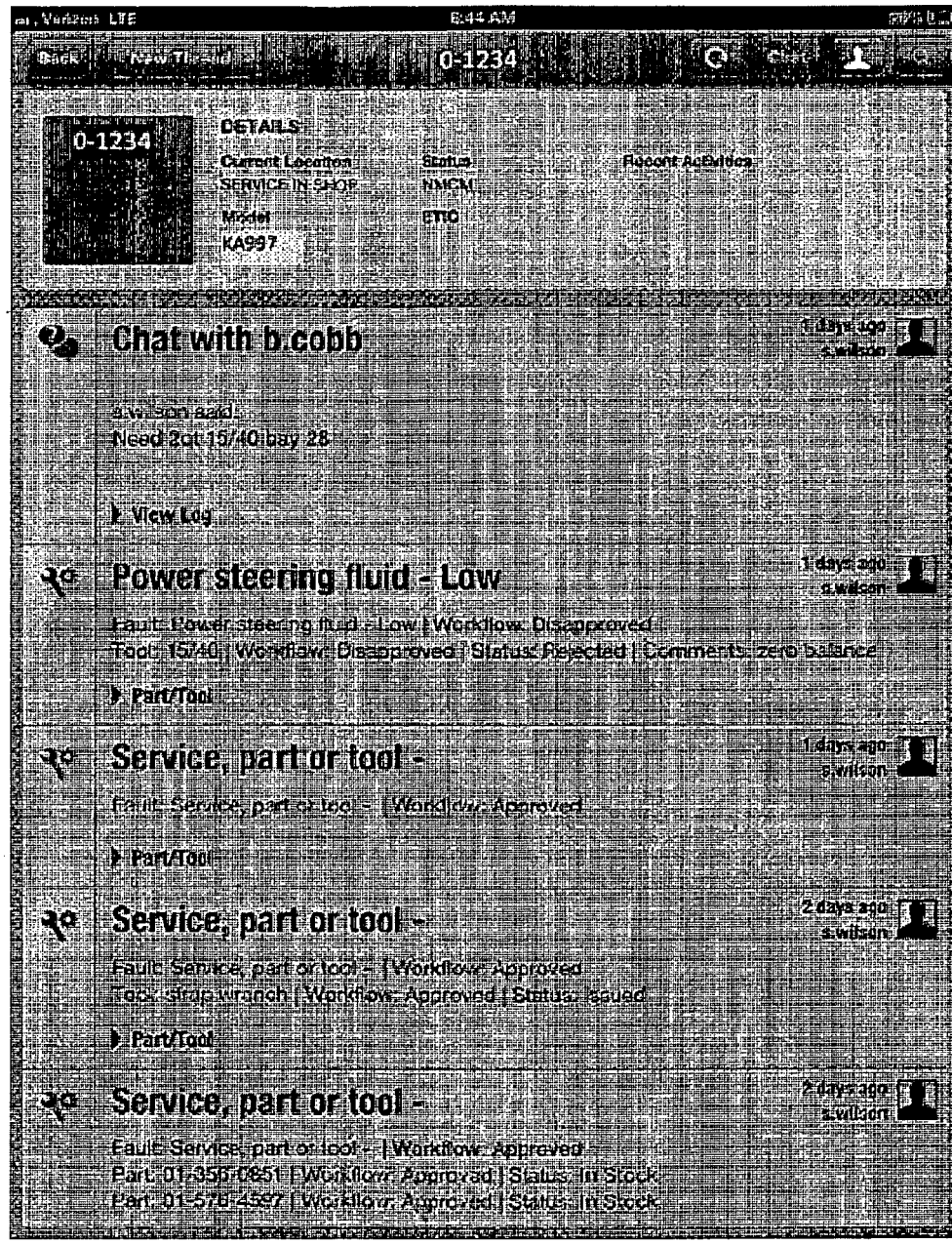
FIG. 18A is another exemplary collaboration screen display for a particular fleet unit, according to one or more embodiments of the present disclosure.

If the user touches an area of display 1700 corresponding to a particular fleet unit and/or collaboration, the application program receives an indication of the user selection and changes the screen display to display all collaborative threads corresponding to the selected collaboration. For example, if the user touches the area corresponding to collaboration 1710, which relates to fleet unit 5325, the application program will change the screen display to show a display 1800a of collaborative threads associated with the selected collaboration. In this example, display 1800a will display the threads related to fleet unit 5325. One embodiment of display 1800a is shown in FIG. 18A. In the embodiment of FIG. 18A, display 1800a comprises thread elements 1810, 1820, 1830, 1840, and 1850. Each thread element also displays various information sub-elements associated with the particular thread. For example, thread element 1810 comprises a user identifier icon 1812 showing an identifier of the user responsible for the last action on thread 1810, a time identifier 1814 showing the time since the last action, an action type icon 1816 representing the type of the last action, and an action summary 1818 showing a summary of the details of the last action.

Figure 18B:
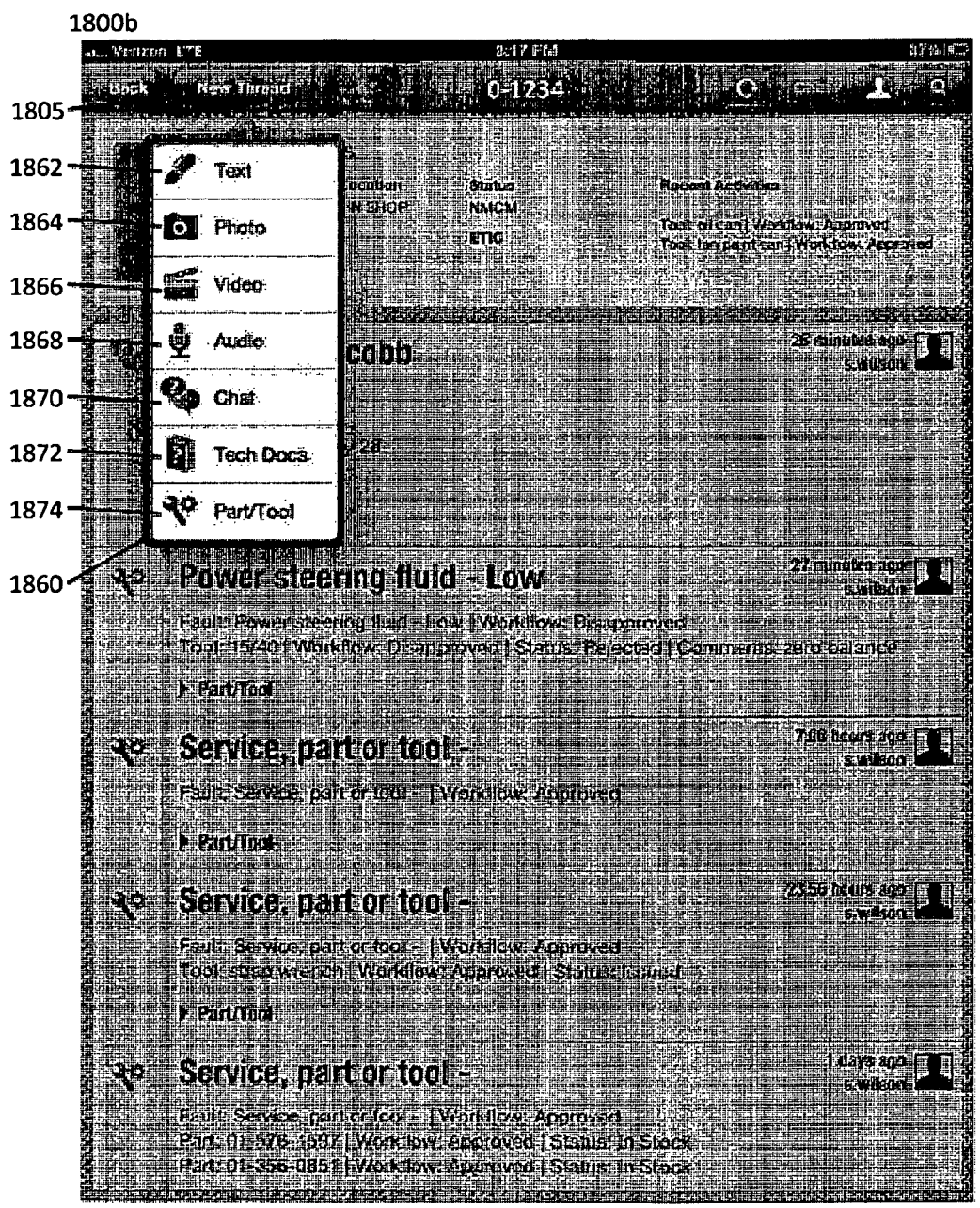
FIG. 18B is another exemplary collaboration screen display for adding a new collaboration thread pertaining to a particular fleet unit, according to one or more embodiments of the present disclosure.

Display 1800a may also comprise a new thread action button 1805. If the user touches the area of display 1800a corresponding to new thread action button 1805, the application program will create a new collaboration thread associated with the particular fleet unit shown in display 1800a, e.g., fleet unit 5325 shown in FIG. 18A. In some embodiments, the application program may prompt the user to enter information identifying the new thread, (e.g., title, metadata, and/or textual description), receive the user entry, and associate the entry with the new thread. In some embodiments, the application program may change the screen display to include drop-down thread type list 1860, such as shown in display 1800b in FIG. 18B. Thread type list 1810 may comprise a plurality of thread action type elements, such as elements 1862, 1864, 1866, 1868, 1870, and 1872, which have the same or similar functionality as respective elements 1012, 1014, 1016, 1018, 1020, and 1022 described above with reference to thread action list 1010 shown in FIG. 10.

Figure 18C:
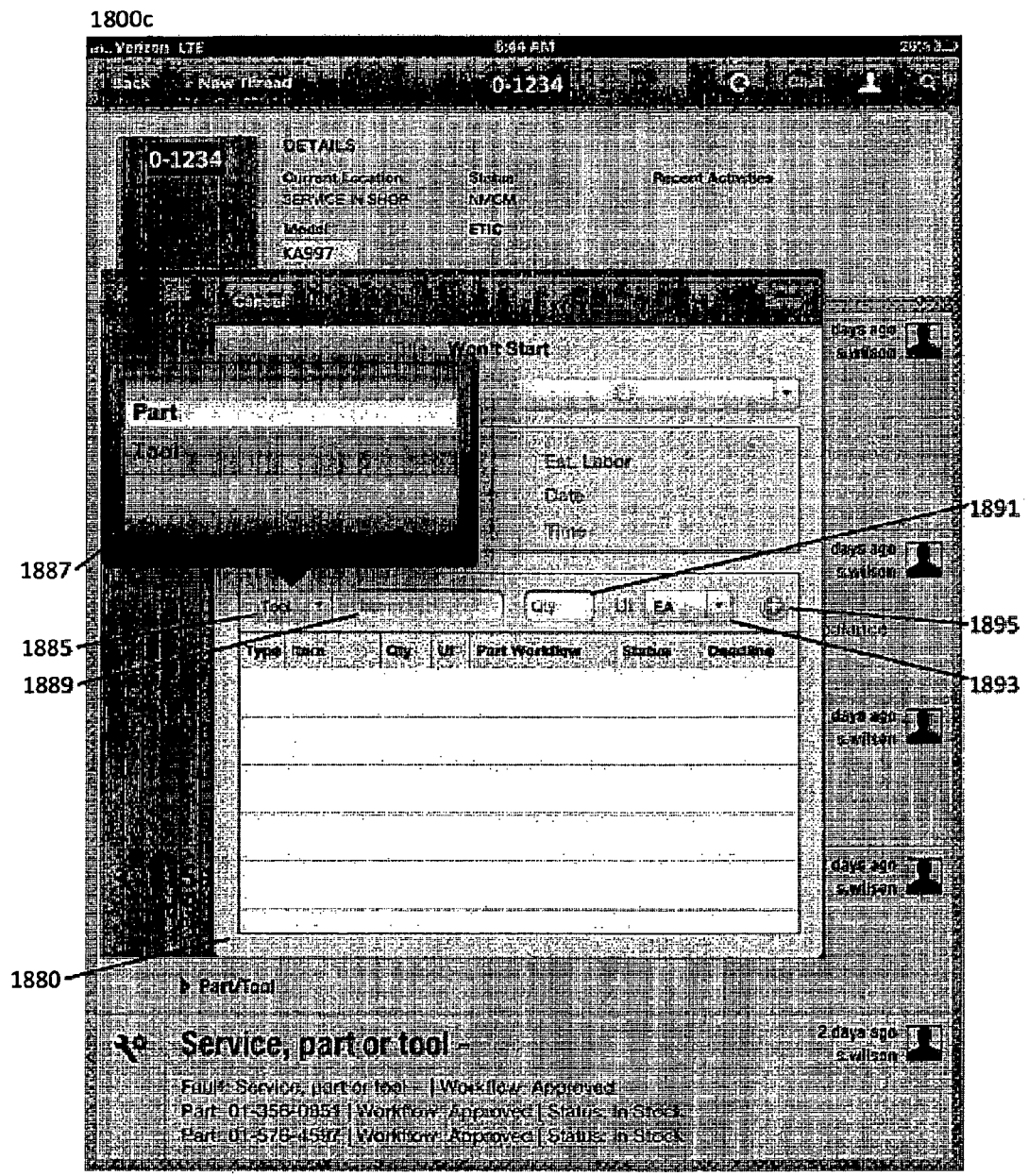
FIG. 18C is an exemplary collaboration screen display for adding a request for service to a new collaboration thread pertaining to a particular fleet unit, according to one or more embodiments of the present disclosure.

New thread type list 1860 may also include a service request element 1874. If the user selects element 1874, this will cause the application program to receive an indication of this selection, start the new thread with a service request activity, and change the display of the user interface device to display 1800c shown in FIG. 18C. Display 1800c includes a service request frame 1880 which comprises an item type selector 1885, an item number entry field 1889, a quantity entry field 1891, a quantity type selector 1893, and a service request update selector 1895. By way of the features of service request frame 1880, the user may associate various items such as tools, parts, and supplies with the service request. For example, if the user touches the area of the touch screen display corresponding to item type selector 1885, the application will display and item type menu 1887 comprised of various types of items that may be associated with the service request. Although exemplary menu 1887 shows two types of items—"Part" and "Tool"—it should be understood that other such menus comprised of items other than or in addition to the ones shown in menu 1887 are possible. The user may select the particular item type by touching the area of the touch screen display corresponding to the desired type.

Next, the user may enter a number (e.g., part number) corresponding to the desired item in item number entry field 1889, along with a numerical quantity of the desired item in quantity entry field 1891. For some items, the entered numerical quantity may be ambiguous so the user may also be required to select from among multiple quantity types using quantity type selector 1893. For example, quantity type selector 1893 may display selections such as "EA" (each), "DZ" (dozen), "FT" (feet length), "L" (liters), "SQM" (square meters) or the like. For items with non-ambiguous numerical quantities, quantity type selector 1893 may display the single valid quantity type as the default selection (e.g., "EA"). After selecting a quantity type, as necessary, the user may then add the desired item to the service request by touching the area of the touch screen display corresponding to the service request update selector 1895. The application will respond by adding the desired item to the list displayed in service request frame 1880. The user may repeat this process with various items as necessary to complete the required tools, parts, and supplies for the service request.

In embodiments where the user interface device comprises a touch screen display, the user may select any display element shown in any of FIGS. 1 through 18 by touching an area on the touch screen display that corresponds to, relates to, or is associated with that display element. In these embodiments, the user may select an item from a single menu or hierarchical series of menus and/or sub-menus by dragging a finger along the screen area corresponding to the displayed menus then releasing it in the area corresponding to the final selection. Other ways of manipulating information such as that shown in FIGS. 1 through 15 in touch screen display embodiments will be apparent to persons of ordinary skill in the art.

In other embodiments, the user interface device may comprise a non-touch screen display and a user input device that is physically separate from the display, such as a keyboard and/or a mouse. In these embodiments, the user may select a display element by, for example, using the mouse to position a cursor over the desired element and clicking a button on the mouse to select the element, as known to persons of ordinary skill in the art. Similarly, the user may select an item from a single menu or hierarchical series of menus and/or sub-menus by dragging a finger along the screen area corresponding to the displayed menus then releasing it in the area corresponding to the final selection. Other ways of manipulating information such as that shown in FIGS. 1 through 18 in non-touch screen display embodiments will be apparent to persons of ordinary skill in the art.

In some embodiments, the application program may utilize available contextual information for the user and/or the device itself to automatically determine relevant information that will be displayed to the user. For example, the contextual information may comprise the current position of the device, which may be determined using one or more available position determination technologies such as GPS, databases of WiFi access point or cell-tower locations, etc. Once known, the device position may be cross-referenced with a database of locations where the fleet unit is commonly located (e.g., bases, MR depots, etc.) to determine which, if any, of those locations the user is currently situated. This information could be used to limit or prioritize the information displayed to the user.

In some embodiments, the application program may use recent collaboration entries made by the user to make certain predictions about the current collaboration. For example, if the user views information related to a specific item (e.g., part, fleet unit, document, page, documentation region of 3D model, etc.), the application program may automatically provide a list of, or links to, past collaborations where the same specific item was referenced. In some embodiments, the application may also provide a list comprised of relevant items that, although not identical to the specific item, share some similarity or association with it (e.g., pages nearby the current page viewed, pages also viewed by a user who viewed the current page, documents also viewed by a user who viewed the current document, other documents viewed on the same collaboration thread, etc.).

The determination of the relevant information based on the user's context can be performed on the device itself, or it can be performed on a server with the results communicated to the device, in a manner such that the user would not notice an impact to the execution speed of the application program. The provision of context-sensitive information could be incorporated in any of the display screens shown in FIGS. 1 through 18, as well as other display screens provided by the application program. Leveraging information on past MR solutions in such a seamless, context-sensitive manner will improve the speed at which a user is able to solve the current MR issue.

Figure 19:
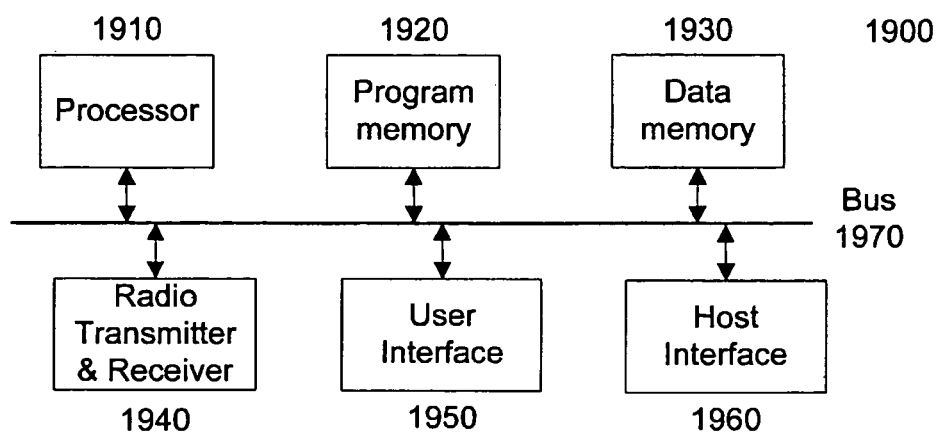
FIG. 19 is a block diagram of an exemplary user interface device, according to one or more embodiments of the present disclosure.

FIG. 19 is a block diagram of exemplary display device or apparatus utilizing certain embodiments of the present disclosure, including execution of the application program that causes display of one or more of the exemplary screen displays shown in FIGS. 1 through 18. Device 1900 comprises processor 1910 that is operably connected to program memory 1920 and data memory 1930 via bus 1970 that may comprise parallel address and data buses, serial ports, or other methods and/or structures known to those of ordinary skill in the art. Program memory 1920 comprises software code executed by processor 1910 that enables device 1900 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11, WiFi, HDMI, USB, Firewire, etc., or any other protocols utilized in conjunction with radio transceiver 1940, user interface 1950, and/or host interface 1960. Program memory 1920 further comprises software code executed by processor 1910 to control the functions of device 1900, including configuring and controlling various components such as radio transceiver 1940, user interface 1950, and/or host interface 1960. Program memory 1920 may also comprise the application program that causes display of one or more of the exemplary screen displays shown in FIGS. 1 through 18. Such software code may be specified or written using any known or future developed programming language, such as e.g. Java, C++, C, Objective C, HTML, XHTML, and Assembler, as long as the desired functionality, e.g., as defined by the implemented method steps, is preserved.

Data memory 1930 may comprise memory area for processor 1910 to store variables used in protocols, configuration, control, and other functions of device 1900, including the display of one or more of the exemplary screen displays shown in FIGS. 1 through 18. As such, program memory 1920 and data memory 1930 may comprise non-volatile memory (e.g., flash memory), volatile memory (e.g., static or dynamic RAM), or a combination thereof. Furthermore, data memory 1930 may comprise a memory slot by which removable memory cards in one or more formats (e.g., SD Card, Memory Stick, Compact Flash) may be inserted and removed. Persons of ordinary skill in the art will recognize that processor 1910 may comprise multiple individual processors (e.g., multi-core processors), each of which implements a portion of the functionality described above. In such case, multiple individual processors may be commonly connected to program memory 1920 and data memory 1930 or individually connected to multiple individual program memories and or data memories. More generally, persons of ordinary skill in the art will recognize that various protocols and other functions of device 1900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 1940 may comprise radio-frequency transmitter and/or receiver functionality that enables device 1900 to communicate with other equipment supporting like wireless communication standards. In an exemplary embodiment, radio transceiver 1940 includes an LTE transmitter and receiver that enable device 1900 to communicate with various Long Term Evolution (LTE) networks (also known as "4G") according to standards promulgated by 3GPP. In some embodiments, radio transceiver 1940 includes circuitry, firmware, etc. necessary for device 1900 to communicate with various UMTS and/or GSM/EDGE networks, also according to 3GPP standards. In some embodiments, radio transceiver 1940 includes circuitry, firmware, etc. necessary for device 1900 to communicate with various CDMA2000 networks, according to 3GPP2 standards. In some embodiments, radio transceiver 1940 is capable of communicating using radio technologies that operate in unlicensed frequency bands, such as IEEE 802.11 WiFi that operates using frequencies in the regions of 2.4 and/or 5.6 GHz. In some embodiments, radio transceiver 1940 may comprise a transceiver that is capable of wired communication, such as by using IEEE 802.3 Ethernet technology. The functionality particular to each of these embodiments may be coupled with or controlled by other circuitry in device 1900, such as processor 1910 executing protocol program code stored in program memory 1920.

User interface 1950 may take various forms depending on the particular embodiment of device 1900. In some embodiments, device 1900 is a mobile phone, in which case user interface 1950 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In such mobile phone embodiments, the particular features comprising the device may depend on whether the device is a smartphone, feature phone, or other type of mobile phone. In other embodiments, device 1900 is a tablet computing device (such as an iPad® sold by Apple, Inc.) comprising a touchscreen display that is much larger than touchscreen displays found on mobile phones. In such tablet embodiments, one or more of the mechanical features of user interface 1950 may be replaced by comparable or functionally equivalent virtual user interface features (e.g., virtual keypad, virtual buttons, etc.) implemented using the touchscreen display of device 1900, as familiar to persons of ordinary skill in the art. In other embodiments, device 1900 may be a digital computing device, such as a laptop computer, desktop computer, workstation, etc. that comprises a mechanical keyboard that may be integrated, detached, or detachable depending on the particular embodiment. Such a digital computing device may also comprise a touch screen display. All embodiments of device 1900 having a touch screen display are capable of receiving the user inputs for selection and manipulation of content, as described above with reference to FIGS. 1 through 18.

In some embodiments, device 1900 may comprise an orientation sensor, which can be used to sense when the user has changed the physical orientation of the device 1900's touch screen display. An indication signal from the orientation sensor may be available to any application program executing on device 1900, such that an application program may change the orientation of a screen display (e.g., from portrait to landscape) automatically when the indication signal shows a 90-degree change in physical orientation of the device. In this manner, the application program can maintain the screen display in a manner that is readable by the user, regardless of the physical orientation of the device.

Host interface 1960 of device 1900 also may take various forms depending on the particular embodiment of device 1900. In embodiments where device 1900 is a mobile phone, host interface 1960 may comprise a USB interface, an HDMI interface, or the like. In some embodiments, device 1900 may comprise more functionality than is shown in FIG. 19. In some embodiments, device 1900 may also comprise functionality such as a video and/or still-image camera, microphone, media player, etc., any of which may be used to capture and/or process media items used in conjunction with collaboration threads, as described above with reference to FIGS. 1 through 18. Moreover, radio transceiver 1940 may include circuitry necessary to communicate using additional radio-frequency communication standards including Bluetooth, GPS, and/or others. Persons of ordinary skill in the art will recognize the above list of features and radio-frequency communication standards is merely exemplary and not limiting to the scope of the present disclosure. Accordingly, processor 1910 may execute software code stored in program memory 1920 to control such additional functionality.

Figure 20:
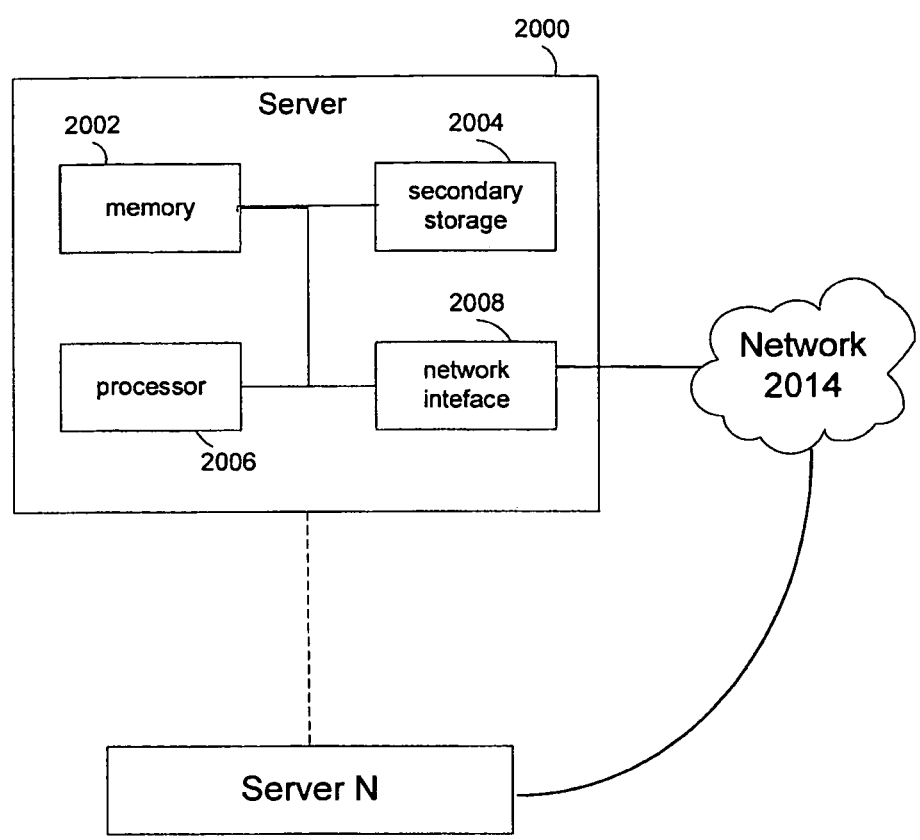
FIG. 20 is a block diagram an exemplary server, according to one or more embodiments of the present disclosure.

FIG. 20 is a block diagram of an exemplary server that may be utilized in conjunction with certain embodiments of the present disclosure, including communication with a user interface device (e.g., device 1900 shown in FIG. 19) that displays one or more of exemplary screen displays shown in FIGS. 1 through 18. Server 2000 typically includes a memory 2002, a secondary storage 2004, a processor 2006 and a network interface 2008. Memory 2002 may include RAM or similar types of memory, and it may store one or more applications (e.g., database applications, communication applications, security applications, etc.) for execution by processor 2006. Secondary storage 2004 may include a hard disk drive, floppy disk drive, CD-ROM drive, or other types of non-volatile data storage. Processor 2006 executes the application(s), which is stored in memory 2002 or secondary storage 2004, or received from the Internet or other network 2014.

Server 2000 may store a database structure in secondary storage 2004, for example, for storing and maintaining information need or used by the application(s). Also, processor 2006 may execute one or more software applications in order to provide the functions described in this specification, specifically in the methods described above, and the processing may be implemented in software, such as software modules, for execution by computers or other machines. The processing may provide and support web pages and other GUIs. The GUIs may be formatted, for example, as web pages in HyperText Markup Language (HTML), Extensible Markup Language (XML) or in any other suitable form for presentation on a display device.

Network interface 2008 may comprise transmitters, receivers, and other circuitry that enables server 2000 to communicate with other equipment in a packet and/or circuit-switched network for purposes of normal operation, as well as for administration and maintenance of server 2000 or other network equipment operably connected thereto. In some embodiments, network interface 2008 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

Although server 2000 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as server 2000, to perform a particular method.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method for creating collaborative threads of information relating to maintenance or repair operations, comprising:
   graphically displaying status information on a user interface device for a plurality of equipment units;
   receiving a first signal from the user interface device indicating a user selection of one of the plurality of equipment units;

displaying a list of one or more elements pertaining to the selected equipment unit;

displaying information related to a selected element based on the user's selection of an element from the list of one or more elements, wherein the displayed information comprises a list of one or more documents related to the selected element and a list of previous maintenance or repair collaborations referencing the selected element, wherein the list of previous maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;

receive a second signal indicating user selection of one of the collaborative threads;

display at least a portion of the information comprising the selected collaborative thread, wherein the displayed information comprises one or more previous actions within the collaborative thread and one or more thread continuation options; and, receiving a third signal from the user interface device indicating user selection of one of the documents in the list;

rendering the selected document on the user interface device; and displaying an indicator of the relative importance of a portion of the document, wherein the relative importance of a portion comprises a metric based on one or more of the number of views, number of zooms, number of annotations, and number of bookmarks of the portion; and the indicator comprises an icon displayed with a color that is determined based on the value of the metric;

initiating a service request; which comprises of:

creating a new collaborative thread;

prompting the user to enter information identifying the new thread;

receive the user entry; and associate the entry with the new thread.

2. The method of claim 1, further comprising:
receiving a fourth signal from the user interface device indicating user selection of a thread continuation option;
capturing information related to the selected collaborative thread; and
appending the captured information to the selected collaborative thread, wherein the captured information is appended as the most recent entry in the selected collaborative thread.

3. The method of claim 1, further comprising:
receiving a fifth signal via a communications port of the user interface device, the fifth signal comprising information related to the selected collaborative thread;
appending at least a portion of the received information to the selected collaborative thread; and
displaying at least a portion of the information comprising the selected collaborative thread, wherein the at least a portion comprises the appended received information.

4. The method of claim 1, further comprising displaying information related to a plurality of equipment units, wherein the information displayed for a particular equipment unit comprises one or more previous actions within a collaborative thread related to the particular equipment unit.

5. The method of claim 4, further comprising selecting the plurality of equipment units for which information is displayed based at least in part on their respective distances from the user interface device.

6. The method of claim 1, wherein the first and second signals are received and the collaborative thread information is displayed via a touch screen display of the user interface device.

7. A method for interactive selection and display of information related to an equipment subject to maintenance or repair, comprising:
displaying a visual representation of at least a portion of the equipment;
receiving a first signal from a user interface device indicating user selection of a region of the equipment for which information is desired;
displaying an indicator of an equipment region and a list of one or more elements within the indicated equipment region;
receiving a second signal from the user interface device indicating user selection of one of the elements in the list;
displaying information related to the selected element, wherein the displayed information comprises a list of one or more documents related to the selected element and a list of previous maintenance or repair collaborations referencing the selected element, wherein the list of previous maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;
receiving a third signal from the user interface device indicating user selection of one of the documents in the list;
rendering the selected document on the user interface device; and
displaying an indicator of the relative importance of a portion of the document,
wherein the relative importance of a portion comprises a metric based on one or more of the number of views, number of zooms, number of annotations, and number of bookmarks of the portion; and
the indicator comprises an icon displayed with a color that is determined based on the value of the metric.

8. The method of claim 7, wherein the selected document comprises at least one of video, audio, images, and text.

9. The method of claim 7, wherein the portion of the document comprises one of an image, a single page of text, and a segment of a video.

10. The method of claim 7, further comprising receiving a fourth signal from the user interface device designating the at least a portion of the equipment for which the visual representation is to be displayed.

11. The method of claim 10, wherein:
the visual representation is a three-dimensional model; and
the fourth signal comprises one of a pan signal, a rotation signal, and a scaling signal.

12. A user interface device capable of creating collaborative threads of information relating to maintenance or repair operations, comprising:
a display;
a processor; and at least one memory including program code that, when executed by the processor, causes the user interface device to:
graphically display status information on a user interface device for a plurality of equipment units;
receive a first signal indicating a user selection of one of a plurality of equipment units;
displaying a list of one or more elements pertaining to the selected equipment unit;
displaying information related to a selected element based on the user's selection of an element from the list of one or more elements, wherein the displayed information comprises a list of one or more documents related to the selected element and a list of previous maintenance or repair collaborations referencing the selected element, wherein the list of previous maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;
receive a second signal indicating user selection of one of the collaborative threads;
display at least a portion of the information comprising the selected collaborative thread, wherein the displayed information comprises one or more previous actions within the collaborative thread and one or more thread continuation options; and,
receiving a third signal from the user interface device indicating user selection of one of the documents in the list;
rendering the selected document on the user interface device; and
displaying an indicator of the relative importance of a portion of the document,
wherein the relative importance of a portion comprises a metric based on one or more of the number of views, number of zooms, number of annotations, and number of bookmarks of the portion; and
the indicator comprises an icon displayed with a color that is determined based on the value of the metric;
initiating a service request which comprises of:
creating a new collaborative thread;
prompting the user to enter information identifying the new thread;
receive the user entry; and
associate the entry with the new thread.

13. The user interface device of claim 12, wherein the at least one memory further comprises program code that, when executed by the processor, causes the user interface device to:
receiving a fourth signal from the user interface device indicating user selection of a thread continuation option;
capturing information related to the selected collaborative thread; and
appending the captured information to the selected collaborative thread, wherein the captured information is appended as the most recent entry in the selected collaborative thread.

14. The user interface device of claim 12, wherein the at least one memory further comprises program code that, when executed by the processor, causes the user interface device to:
receive a fifth signal via a communications port of the user interface device, the fifth signal comprising information related to the selected collaborative thread;
append at least a portion of the received information to the selected collaborative thread; and
display at least a portion of the information comprising the selected collaborative thread, wherein the at least a portion comprises the appended received information.

15. The user interface device of claim 12, wherein the at least one memory further comprises program code that, when executed by the processor, causes the user interface device to display information related to a plurality of equipment units, wherein the information displayed for a particular equipment unit comprises one or more previous actions within a collaborative thread related to the particular equipment unit.

16. The user interface device of claim 15, wherein the at least one memory further comprises program code that, when executed by the processor, causes the user interface device to select the plurality of equipment units for which information is displayed based at least in part on their respective distances from the user interface device.

17. The user interface device of claim 12, wherein:
the display comprises a touch screen display; and
the first and second signals are received and the collaborative thread information is displayed via the touch screen display.

18. A user interface device capable of interactive selection and display of information related to an equipment subject to maintenance or repair, comprising:
a display;
a processor; and
at least one memory including program code that, when executed by the processor, causes the user interface device to:
display a visual representation of at least a portion of the equipment;
receive a first signal indicating user selection of a region of the equipment for which information is desired;
display an indicator of an equipment region and a list of one or more elements within the indicated equipment region;
receive a second signal indicating user selection of one of the elements in the list;
displaying information related to the selected element, wherein the displayed information comprises a list of one or more documents related to the selected element and a list of previous maintenance or repair collaborations referencing the selected element, wherein the list of previous maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;
receive a third signal indicating user selection of one of the documents in the list;
render the selected document on the user interface device; and,
display an indicator of the relative importance of a portion of the document,
wherein the relative importance of a portion comprises a metric based on one or more of the number of views, number of zooms, number of annotations, and number of bookmarks of the portion; and the indicator comprises an icon displayed with a color that is determined based on the value of the metric.

19. The user interface device of claim 18, wherein the selected document comprises at least one of video, audio, images, and text.

20. The user interface device of claim 18, wherein the portion of the document comprises one of an image, a single page of text, and a segment of a video.

21. The user interface device of claim 18, further comprising program code that, when executed by the processor, causes the user interface device to receive a fourth signal from the user interface device designating the at least a portion of the equipment for which the visual representation is to be displayed.

22. The user interface device of claim 21, wherein:
the visual representation is a three-dimensional model; and
the fourth signal comprises one of a pan signal, a rotation signal, and a scaling signal.

23. A non-transitory computer-readable medium comprising a set of instructions that, when executed by an apparatus comprising at least one processor and capable of displaying collaborative threads of information relating to maintenance or repair operations, cause the apparatus to:
graphically display status information on a user interface device for a plurality of equipment units;
receive a first signal indicating a user selection of one of a plurality of equipment units;
displaying a list of one or more elements pertaining to the selected equipment unit;
displaying information related to a selected element based on the user's selection of an element from the list of one or more elements, wherein the displayed information comprises a list of one or more documents related to the selected element and a list of previous maintenance or repair collaborations referencing the selected element, wherein the list of previous maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;
receive a second signal indicating user selection of one of the collaborative threads;
display at least a portion of the information comprising the selected collaborative thread, wherein the displayed information comprises one or more previous actions within the collaborative thread and one or more thread continuation options; and,
receiving a third signal from the user interface device indicating user selection of one of the documents in the list;
rendering the selected document on the user interface device; and
displaying an indicator of the relative importance of a portion of the document,
wherein the relative importance of a portion comprises a metric based on one or more of the number of views, number of zooms, number of annotations, and number of bookmarks of the portion; and
the indicator comprises an icon displayed with a color that is determined based on the value of the metric;
initiating a service request which comprises of:
creating a new collaborative thread;
prompting the user to enter information identifying the new thread;
receive the user entry; and
associate the entry with the new thread.

24. The non-transitory computer-readable medium of claim 23, further comprising instructions that, when executed by the apparatus, causes the apparatus to:
receiving a fourth signal from the user interface device indicating user selection of a thread continuation option;
capturing information related to the selected collaborative thread; and
appending the captured information to the selected collaborative thread, wherein the captured information is appended as the most recent entry in the selected collaborative thread.

25. The non-transitory computer-readable medium of claim 23, further comprising instructions that, when executed by the apparatus, causes the apparatus to:
receive a fifth signal via a communications port of the apparatus, the fifth signal comprising information related to the selected collaborative thread;
append at least a portion of the received information to the selected collaborative thread; and
display at least a portion of the information comprising the selected collaborative thread, wherein the at least a portion comprises the appended received information.

26. A non-transitory computer-readable medium comprising a set of instructions that, when executed by an apparatus comprising at least one processor and capable of interactive selection and display of information related to an equipment subject to maintenance or repair, causes the apparatus to:
display a visual representation of at least a portion of the equipment;
receive a first signal indicating user selection of a region of the equipment for which information is desired;
display an indicator of an equipment region and a list of one or more elements within the indicated equipment region;
receive a second signal indicating user selection of one of the elements in the list;
display information related to the selected element, wherein the displayed information comprises a list of one or more documents related to the selected element and a list of maintenance or repair collaborations referencing the selected element, wherein the list of maintenance or repair collaborations includes a collaborative thread that corresponds to a task related to the selected element, wherein the displayed information further comprises a timeline showing periods of activity for each task including icons identifying individuals who worked on the task and the time during which each individual worked on the task;
receive a third signal indicating user selection of one of the documents in the list;
render the selected document; and,
display an indicator of the relative importance of a portion of the document,
wherein the relative importance of a portion comprises a metric based on one or more of the number of views, number of zooms, number of annotations, and number of bookmarks of the portion; and
the indicator comprises an icon displayed with a color that is determined based on the value of the metric.

27. The computer-readable medium of claim 26, wherein the selected document comprises at least one of video, audio, images, and text.

\* \* \* \* \*